US008355933B2

(12) United States Patent
Loy et al.

(10) Patent No.: US 8,355,933 B2
(45) Date of Patent: Jan. 15, 2013

(54) METHOD AND APPARATUS FOR INCREASING LIQUID ASSETS AVAILABLE TO AT LEAST PARTIALLY FUND LIVING EXPENSES AT AN ASSISTED LIVING FACILITY

(76) Inventors: Philip R. Loy, Canton, GA (US); Ron L. Kreiter, Danville, KY (US); Darwin M. Bayston, Kennesaw, GA (US)

( * ) Notice: Subject to any disclaimer, the term of this patent is extended or adjusted under 35 U.S.C. 154(b) by 602 days.

(21) Appl. No.: 12/692,500

(22) Filed: Jan. 22, 2010

(65) Prior Publication Data
US 2010/0161357 A1 Jun. 24, 2010

Related U.S. Application Data

(63) Continuation-in-part of application No. 11/022,584, filed on Dec. 23, 2004, now abandoned.

(51) Int. Cl.
*G06Q 40/00* (2012.01)
(52) U.S. Cl. .................................. 705/4; 705/35; 705/37
(58) Field of Classification Search ................. 705/4, 35, 705/37
See application file for complete search history.

(56) References Cited

U.S. PATENT DOCUMENTS

| | | | |
|---|---|---|---|
| 5,926,800 A * | 7/1999 | Baronowski et al. | 705/35 |
| 6,330,541 B1 | 12/2001 | Meyer et al. | |
| 6,393,405 B1 | 5/2002 | Vicente | |
| 2001/0047325 A1 * | 11/2001 | Livingston | 705/38 |
| 2004/0148202 A1 | 7/2004 | Siefe et al. | |
| 2004/0225537 A1 * | 11/2004 | Darr | 705/4 |
| 2006/0206415 A1 * | 9/2006 | Ross | 705/38 |
| 2009/0265190 A1 * | 10/2009 | Ashley et al. | 705/4 |

OTHER PUBLICATIONS

Office Action for U.S. Appl. No. 11/022,584 dated Jul. 22, 2010 (12 pages).

* cited by examiner

*Primary Examiner* — Muriel Tinkler
(74) *Attorney, Agent, or Firm* — Daniel C. Crilly; GrayRobinson, P.A.

(57) ABSTRACT

A liquid asset enhancement system includes computing apparatus operated on behalf of an underwriter and a purchase coordinator. The underwriter's apparatus receives an individual's personal, medical history, and life insurance policy information via a communication network. The underwriter's apparatus determines (i) a mortality rating based at least on the individual's medical history, (ii) a life expectancy from a mortality table based on the mortality rating and the individual's personal information, and (iii) a proposed sale value for the policy based at least on the life expectancy and the policy information. If the individual elects to sell the policy, the underwriter's apparatus communicates at least the policy information, the individual's medical history, and the proposed sale value to the purchase coordinator's apparatus via a communication network for sale completion and delivery of proceeds therefrom to a party bound to use the proceeds to pay the insured's assisted living expenses.

21 Claims, 10 Drawing Sheets

METHOD AND APPARATUS FOR INCREASING LIQUID ASSETS AVAILABLE TO AT LEAST PARTIALLY FUND LIVING EXPENSES AT AN ASSISTED LIVING FACILITY

CROSS-REFERENCE TO RELATED APPLICATIONS

The present application is a continuation-in-part of U.S. application Ser. No. 11/022,584, filed Dec. 23, 2004 now abandoned, which is incorporated herein by this reference and upon which the present application claims priority under 35 U.S.C. 120.

BACKGROUND OF THE INVENTION

1. Field of the Invention

The present invention relates generally to the funding of living expenses for individuals considering relocation to a nursing home, assisted living center, hospital, long term care facility or any other assisted living facility and, in particular, to a method and apparatus for increasing liquid assets of such individuals for use in paying at least some of the living expenses incurred at assisted living facilities through sale of the individuals' life insurance policies.

2. Current Relevant Art

Life insurance has been a valued product for many years. Individuals, relatives and corporations have purchased life insurance to protect themselves, their families and, in the case of officers and directors, their businesses from, inter alia, sudden loss of income. However, as a wage earner becomes older, the need to protect the family from sudden loss of the wage earner decreases or is eliminated. Alternatively, in the case of a corporation, the officer or director on whose life a life insurance policy was issued may have retired or otherwise left the corporation, and the corporation no longer has a need for the policy.

In the past, the options for an elderly insured was to allow the policy to lapse or, in the case of life insurance policies that were not paid up over time, continue to pay the premiums, which in some cases are rather large, if coverage was still desired for some reason. However, new needs typically arise for the insured and his or her family as the insured grows older. For example, medical needs of terminally or chronically ill individuals may require a large outlay of cash or other liquid assets to pay for services that are not covered by the individual's health insurance, Medicare, or Medicaid. In some cases, such individuals are best served by entering a nursing home or other assisted living facility where they can receive necessary, professional care on a regular basis.

When a terminally or chronically ill person, age 65 or older, desires to enter a nursing home or other assisted living facility and further desires to use Medicaid to fund the person's stay and care, state Medicaid regulations generally require the person to divest himself or herself of substantially all liquid and liquidatable assets, subject to state-specific exemptions. Such regulations typically permit the person to retain a small amount of liquid or liquidatable assets. For example, states generally limit the face value of life insurance of an assisted living, Medicaid recipient to an amount of one thousand five hundred dollars ($1,500.00) or less. Thus, in many cases, a considerable amount of a person's life insurance is vulnerable to divestment in order to receive Medicaid funding of assisted living expenses.

Several methods presently exist to enable a Medicaid applicant to divest himself or herself of life insurance owned by the applicant. First, the applicant can simply cash in his or her policy for whatever cash value is in the policy. However, the cash value is often very small when compared to the costs of funding assisted living services and does not generally afford the Medicaid applicant sufficient funds to pay for living expenses associated with residing at a nursing home, an assisted living center, a long term care facility, or any other assisted living facility. Moreover, due to the substantial nature of the costs associated with providing assisted living services, the cash value of the applicant's life insurance policy is typically incapable of providing any significant delay in connection with the need for Medicaid or other governmental assistance funds.

More recently, insurance companies have afforded the owner of a life insurance policy the opportunity to transfer any cash value or accelerated death benefit the owner has in the life insurance policy into a limited long term care policy at the time the owner enters a nursing home or other assisted living facility. While the popularity of accelerated death benefits is slowly evolving, such benefits are most often available only for policies in which the owner is the insured and only when either the life expectancy of the insured is twelve months or less or the insured's illness, disease, or condition falls within certain specified categories.

As a third option, the owner of the life insurance policy may present the policy to a viatical or life settlement provider in an effort to obtain cash for the policy. Viatical settlements are liquidation vehicles for life insurance policies in which a viatical settlement provider determines a life expectancy of the insured based on a variety of factors, including the medical history of the insured, and, based on the life expectancy and the face value of the policy, offers the owner of the policy a percentage of the face value of the policy, less any outstanding loans or presently due premiums. The proceeds to fund the offer are acquired from investors (e.g., institutional or individual investors). Presently, the amount of a viatical settlement offer is largely unregulated, although the cash payment made to the policy owner is required to be more than the cash value or accelerated death benefit, if any, of the policy. Some states specify the percentages that must be paid to the policy owner if the insured has a life expectancy of twenty four (24) months or less. Such specified percentages are typically eighty percent (80%) if the insured's life expectancy is less than six months, seventy percent (70%) if the insured's life expectancy is at least six months, but less than twelve months, sixty-five percent (65%) if the insured's life expectancy is at least twelve months, but less than eighteen months, and sixty percent (60%) if the insured's life expectancy is at least eighteen months, but less than twenty-four months. In exchange for the viatical settlement, the policy owner assigns or otherwise transfers his or her ownership of the life insurance policy to the viatical settlement provider, which in turn transfers the policy to the particular investor. The viatical settlement proceeds are generally held by an escrow agent until the policy owner has transferred the policy to the viatical settlement provider, at which time the proceeds are disbursed by the escrow agent to the ex-policy owner or his designee (e.g., an attorney or a guardian).

While the foregoing methods for liquidating some or all of the face value of a life insurance policy are presently available to the policy owner, none of the methods require or insure that the proceeds received by the policy owner are used to pay the living expenses of the policy owner while the policy owner resides at an assisted living facility. Since the policy owner or its designee has no obligation to use the liquidated or divested proceeds to fund assisted living expenses, state and federal assistance programs, such as Medicaid, often do not reap any benefit of the program applicant's divestiture of life insurance policies. In addition, there is presently no procedure for advising an individual or his guardian as to the individual's various options for divesting of life insurance policies owned by the individual to increase the assets used by the individual to pay assisted living expenses and, thereby, temporarily defer the individual's reliance on government assistance.

U.S. Patent Application Publication No. US 2004/0225537 ("the '537 Publication") discloses a method for raising funds for non-profit organizations using life insurance policies. Pursuant to the disclosed method, a non-profit organization ("NPO") identifies individuals or groups of individuals in whom the NPO has a potential insurable interest. The NPO then requests authorization from the individuals to take out life insurance policies on the lives of the individuals pursuant to the NPO's insurable interests. Upon receiving authorization from the individuals, the NPO takes out one or more life insurance policies covering the insurable interests naming the NPO as beneficiary. The NPO may also group the life insurance policies and sell the policies to raise funds for the NPO. The NPO utilizes a "passive vehicle" to hold the insurance policies so that the passive vehicle is "bankruptcy remote." Therefore, while providing a means for funding an NPO, the method disclosed in the '537 Publication provides no benefit to an individual seeking funding for assisted living expenses.

U.S. Patent Application Publication No. US 2004/0148202 ("the '202 Publication") discloses a system in which an insurance policy is purchased from an insured and replaced with a substitute policy at a lower face value and premium. The replaced policy may or may not be maintained long term depending upon, inter alia, a life expectancy of the insured. While providing a means for an aging individual to maintain at least some form of life insurance instead of having to allow the original policy to simply expire due to the individual's inability to continue making premium payments, the '202 Publication provides no mechanism through which the individual may increase his or her liquid assets for purposes of funding assisted living expenses.

U.S. Pat. No. 5,926,800 ("the '800 Patent") discloses a system for providing loans to owners of life insurance policies where the owner retains ownership of the policies during his or her lifetime, and the insured obtains a line of credit upon terms determined by an algorithm used by the system. Therefore, while providing one mechanism for extracting cash from a life insurance policy, the '800 Patent does not disclose or suggest any means for delaying or deferring the individual's reliance upon government assistance. Rather, the loan approach disclosed in the '800 Patent would potentially permit the policy owner to extract proceeds from a life insurance policy and simultaneously qualify for Medicaid, thereby increasing the governmental assistance burden.

U.S. Patent Application Publication No. US 2001/0047325 A1 ("the '325 Publication") discloses a method for providing lines of credit or loans to terminally ill and health-compromised individuals who have a qualified life insurance policy. The loans are secured by the policy. Upon death, the company collects the benefits of the life insurance policy, pays off the loan and any premiums advanced by the lender plus origination fees and accrued interest, and gives the remaining funds to the beneficiary designated by the borrower. Therefore, similar to the '800 Patent, the '325 Publication does not disclose or suggest any means for lightening the government's burden of providing funds for assisted living expenses of terminally ill individuals.

U.S. Pat. No. 6,393,405 ("the '405 Patent") discloses a method of calculating payout ratios in a transaction in which a chronically ill individual sells a portion of his or her life insurance proceeds in exchange for an investor paying the premiums. The policy remains owned by the individual, but the death benefit to the individual's own beneficiaries decreases the longer the investor pays the premiums. However, the '405 Patent does not disclose or suggest any means for liquidating the life insurance policy for purposes of funding the assisted living expenses of the individual, thereby delaying the individual's dependence on governmental assistance.

Finally, U.S. Pat. No. 6,330,541 ("the '541 Patent") discloses a system and method of managing a pool of life insurance policies to generate a consistent cash flow from death benefits paid on the insurance polices so that at least a portion of the cash flow may be sold to a third party. While providing a mechanism for administratively managing a pool of life insurance policies, the '541 Patent provides no means for increasing the liquid assets of an individual to meet at least some of the assisted living expenses of the individual.

Therefore, a need exists for a method of increasing liquid assets available to an individual (e.g., an owner of a life insurance policy) to at least partially fund living expenses of the individual at an assisted living facility that provides a mechanism for advising the individual as to the availability of selling the individual's life insurance policy and that insures proceeds of any such sale are indeed used to pay the assisted living expenses of the individual, thereby delaying, if even for a short period, the individual's dependence upon government assistance.

SUMMARY OF THE INVENTION

Therefore, it is one object of the present invention to provide a method and apparatus for increasing liquid assets available to an individual to at least partially fund living expenses (including medical and other healthcare expenses) of the individual at an assisted living facility.

It is a further object according to one embodiment of the present invention to provide a method in which an entity, such as the assisted living facility, advises the individual as to the availability of selling a life insurance policy owned by the individual and may further advise the individual as to the availability and requirements for obtaining government assistance (e.g., through Medicare and/or Medicaid) to fund the individual's assisted living expenses if the individual meets pre-established criteria for obtaining such assistance. Such criteria may include divestiture of substantially all the liquid and liquidatable assets owned by the individual.

It is a further object of the present invention to provide a means for individuals to remain private pay patients at assisted living facilities for as long as possible, thereby deferring the individuals' dependence on governmental assistance and decreasing the pressure on governmental budgets to subsidize the living expenses of such individuals.

To solve the problems described above and to realize the objects of this invention, the present invention encompasses, according to one embodiment, a method for increasing liquid assets available to an individual to at least partially fund living expenses of the individual at an assisted living facility, wherein an entity, such as the assisted living facility (e.g., through an admissions or other representative thereof), consults with the individual to determine what assets are available to the individual to pay for the assisted living facility's services. If the individual's assets include ownership of a life insurance policy, the entity advises the individual as to the ability of the individual to convert the policy into a liquid asset (e.g., cash) through sale of the policy. If, after being apprised of the option to sell the life insurance policy, the individual elects to proceed with such a sale, the entity advises the individual as to the identity of (e.g., refers the individual to) a potential purchaser, such as, for example, a viatical settlement provider, a financial institution, a governmental agency, a broker that acts as a representative of the viatical settlement provider or financial institution, or any other person or entity permitted under applicable law to purchase a life insurance policy. To facilitate the individual's sale of the life insurance policy, the entity may receive information related to the life insurance policy and/or the medical history or physical condition of the person insured by the life insurance policy (which may or may not be the individual in need of assisted living care), and provide such information to the potential purchaser after receiving written authorization from the individual or the insured, as applicable. The assisted living facility preferably receives payment for its services from the individual out of at least a portion of the proceeds received by the individual as a result of the sale of the life insurance policy.

To insure that the sale proceeds (or at least a predetermined amount of the sale proceeds) are indeed used to pay the assisted living expenses of the individual, the proceeds are preferably paid into a trust for the benefit of the individual or are otherwise delivered to a third party bound to use the proceeds to pay the assisted living expenses of the individual. The trustee then pays the assisted living facility for the services provided to the individual (e.g., on a monthly or weekly basis, or responsive to invoices issued by the assisted living facility). In the event that the individual dies before exhausting the sale proceeds, such proceeds may be used to pay the individual's funeral expenses or may be distributed to one or more heirs of the individual.

In an alternative embodiment, a computer-based system may be utilized to facilitate the liquidation of the insured's life insurance policy, if liquidation is so desired by the insured. For example, in one embodiment, the system includes at least one computing apparatus operated on behalf of an underwriting entity (e.g., an insurance underwriter) and another computing apparatus operated on behalf of a purchase coordinator. Each computing apparatus may be a single computing device (e.g., a computer, server, smart phone, personal digital assistant (PDA), or Internet-accessible cell phone) or a networked set or combination of devices that includes at least one computing device (e.g., a local area network (LAN) containing one or more personal computing devices, one or more servers, and various other peripheral equipment). The underwriter's apparatus receives personal information regarding the individual (e.g., identification and other personal information), information regarding a medical history of the individual, and information regarding a life insurance policy for the individual. The information may be provided by the individual or on the individual's behalf (e.g., by a relative, a guardian, a personal representative, an attorney, or an employee of the assisted living facility) via a computing device that has accessed a website operated on behalf of the underwriting entity. The information regarding the individual may include gender information, age information (e.g., age, birth date, or other information from which the insured individual's age is determinable), and information relating to whether the individual smokes. The information regarding a medical history of the individual may include information regarding at least one health impairment currently and/or previously possessed by the individual and information regarding the severity of each health impairment. The information regarding a life insurance policy for the individual may include a death benefit amount, an issue date, information regarding frequency and amount of premium payments, information regarding outstanding loans secured by the life insurance policy, and information regarding a cash surrender value of the life insurance policy (if any).

After receiving the insured individual's personal information, medical history, and life insurance policy information, the underwriter's apparatus then determines a mortality rating for the insured individual based at least on the insured's medical history information (e.g., current and/or past health impairments and associated severities). In one embodiment, the underwriter's computer apparatus assigns point values (e.g., so-called "debits") to a variety of health impairments based on their severities such that more severe health impairments are assigned higher point values than less severe health impairments. The point values may be stored in a memory or database of the underwriter's computing apparatus. The underwriter's computing apparatus may then determine, from the stored point values, a point value for each health impairment possessed by the individual to produce a set of determined point values. The underwriter's computing apparatus may further sum the set of determined point values to produce the mortality rating for the individual.

After determining the mortality rating for the individual, the underwriter's apparatus accesses a database containing a mortality table and determines a life expectancy for the insured individual from the mortality table based at least on the insured individual's personal information (e.g., the insured's current age, gender, and smoking status) and the mortality rating. Thereafter, the underwriter's apparatus determines a proposed sale value for the life insurance policy based at least on the life expectancy and the life insurance policy information. In one embodiment, the proposed sale value also takes into account a rate of interest to be earned by a potential purchaser of the life insurance policy. Alternatively or additionally, the proposed sale value may be regulated by statutory guidelines established by the state in which the sale of the life insurance policy may be completed.

After the proposed sale value for the life insurance policy has been determined, the underwriting entity provides the proposed sale value to the individual, either directly or through a third party, such as a relative, a guardian, a personal representative or attorney, or an employee of the assisted living facility. In a preferred embodiment, the underwriter's computing apparatus provides the proposed sale value to the individual's computing device (e.g., computer, smart phone, PDA, or Internet-accessible cell phone) or a computing device operated by a third party authorized by the individual. For example, the individual or the third party may log in (e.g., using a user name and password) to a secure website operated by the underwriting entity and view the proposed sale value in a member account established on the website for the individual.

Some time after providing the proposed sale value to the individual, the underwriter's computing apparatus receives an election of the individual to either proceed or not proceed with a sale of the life insurance policy for the proposed sale value. For example, the election may be made through the website operated on behalf of (e.g., by or for) the underwriting entity. Responsive to an election to sell the life insurance policy, the underwriter's computing apparatus communicates the life insurance policy information, the insured's medical history information, and the proposed sale value over a communication network (e.g., the Internet) to a computing apparatus operated on behalf of a purchase coordinator for purposes of allowing the purchase coordinate to coordinate completion of the sale to a purchaser. For example, the secure website operated on behalf of the underwriting entity may include a section accessible only by pre-registered purchase coordinators to assess available life insurance policies for sale. Alternatively, the underwriter's computing apparatus may send a message (e.g., an email, instant message, text message, synthesized voice message, data file, or other communication) to the computing apparatus of one or more purchase coordinators to facilitate sale of the life insurance policy. In one embodiment, the message sent from the underwriter's computing apparatus to the purchase coordinator's computing apparatus is encrypted in accordance with conventional encryption techniques to maintain the privacy of the insured individual's information and of the transaction.

After receiving the proposed sale value for the life insurance policy, the purchase coordinator solicits potential purchasers for the life insurance policy via a communication network, such as the Internet. The solicitations may include the life insurance policy information, the proposed sale value, the medical history information of the individual, and at least some of the individual's personal information. For example, the purchase coordinator's computing apparatus may include a server or other computing device on which a website is hosted. In operation, the website may allow pre-registered potential purchasers to access areas of the website in which life insurance policies are offered for sale and information relating to the insureds are available for analysis. The policies may be offered for sale in an auction format with a reserve maintained in at least the amount of the proposed sale value. Alternatively, the purchase coordinator's computing apparatus may send messages to computing apparatus operated by potential purchasers notifying the purchasers that the life insurance policy is for sale. In one embodiment, the message sent from the purchase coordinator's computing apparatus to the potential purchasers' computing apparatus is encrypted in accordance with conventional encryption techniques to maintain the privacy of the insured individual's information and of the transaction. Additionally, prior to disclosing the insured's medical history information to a purchase coordinator, the purchase coordinator preferably obtains authorization from the insured individual (e.g., in the form of a Health Information Portability and Accountability Act (HIPAA) release or equivalent) to disclose the medical information to potential purchasers of the life insurance policy.

If, after soliciting potential purchasers, one or more such purchasers are interested in purchasing the life insurance policy, the purchase coordinator receives bids to buy the life insurance policy from the potential purchasers via a communication network (e.g., the communication network over which the sale of the policy was solicited). For example, the purchase coordinator may receive the bids via its website or via other communication (e.g., email) from computing apparatus operated on behalf of the potential purchasers. Provided that at least one of the bids is greater than or equal to the proposed sale value, the purchase coordinator selects one of the bids (e.g., the highest bid) as a winning bid for the life insurance policy and effects the sale of the life insurance policy to the successful purchaser for a purchase price equivalent to the winning bid. In one embodiment, the purchase coordinator uses its computing apparatus to notify the potential purchasers of the results of the bidding (e.g., whether their individual bids were successful or not). The purchase coordinator also attends to preparation and execution of necessary documents to effect the sale, and to the acquisition of the purchase price from the successful purchaser.

After the sale of the policy has been completed, the purchase coordinator attends to delivering proceeds from the purchase price to a party other than the individual for use in paying at least some of the living expenses of the individual at the assisted living facility. The party to whom the proceeds are delivered is bound (e.g., by contract or another legal document, such as a trust) to use the proceeds for paying at least some of the living expenses of the individual at an assisted living facility. Consequently, in one embodiment, the sale proceeds are delivered to a trustee of a trust established to pay at least some of the living expenses of the individual at the assisted living facility. Such a trust may include beneficiaries to whom any remaining proceeds would be delivered in the event that the individual passes away prior to expiration of the sales proceeds.

In one embodiment, the underwriter's computing apparatus includes a server operated on behalf of (e.g., by or for) the underwriting entity. In such an embodiment, the server hosts a website operable to receive information entered by users of the website, such as the insured individual or his/her designee. For example, the server may be owned and operated by the underwriting entity or it may be leased wholly or partially from a third party to host a website operated on behalf of the underwriting entity. The personal information regarding the individual, the information regarding the medical history of the individual, and the information regarding the life insurance policy for the individual is received at the server via the website from a computing device used on behalf of the individual (e.g., by the individual or his or her designee).

According to another embodiment, the mortality table used to determine an individual's life expectancy is derived at least partially from empirical data collected by the underwriting entity regarding deceased individuals. The empirical data used to create such a mortality table may include ages of the individuals at death and at time of health impairment evaluation on behalf of an underwriting entity (e.g., by a doctor employed or paid by the underwriting entity), type of health impairments and associated severities at time of health impairment evaluation on behalf of the underwriting entity, and medical scores (e.g., underwriting debits or point values) at time of health impairment evaluation on behalf of the underwriting entity. Alternatively, the mortality table may be a conventional actuarial table used in the health and/or life insurance fields.

In another embodiment, the underwriter's computing apparatus determines an individual's life expectancy by first categorizing the individual into a category of the mortality table based on the individual's age, gender, smoking status, and mortality rating. Based on such categorization, the underwriter's computing apparatus determines the life expectancy for the individual from the mortality table as a life expectancy for the category into which the individual was categorized.

In yet another embodiment, the underwriter's computing apparatus may determine the proposed sale value for the life insurance policy taking into account an expected interest rate for a successful purchaser. For example, the underwriter's computing apparatus may determine a discount value based on the information regarding the life insurance policy, the life expectancy for the individual, and an expected interest rate for the successful purchaser. The underwriter's computing apparatus then subtracts the discount value from the death benefit amount of the life insurance policy to determine the proposed sale value. For example, if the death benefit amount of the life insurance policy is $100,000, the life expectancy of the individual is five (5) years, the remaining premiums over those five years is $20,000, there are no outstanding loans secured by the life insurance policy, and the expected annual interest rate is 10%, then the discount value is $51,258, which would be subtracted from the death benefit amount to render a proposed sale value of $48,742 (e.g. net present value of $100,000 death benefit minus net present value of $20,000 in premiums paid over five (5) years).

In yet another embodiment, the underwriter's computing apparatus may alternatively determine the proposed sale value for the life insurance policy taking into account an expected interest rate for a successful purchaser. For example, the underwriter's computing apparatus may determine a percentage of the life insurance policy's death benefit amount based on the expected interest rate for the successful purchaser to produce a discount percentage. The underwriter's computing apparatus may also determine a total balance of outstanding loans secured by the life insurance policy based on information regarding such outstanding loans as included in the life insurance policy information to produce a total loan balance. The underwriter's computing apparatus may further determine a total balance of premiums remaining to be paid for the life insurance policy based on the life expectancy for the individual and information regarding frequency and amount of premium payments as included in the life insurance policy information to produce a total premium balance. The total loan balance and the total premium balance are then subtracted from the death benefit amount to produce a difference. The difference is multiplied by the discount percentage to produce a result. If the life insurance policy does not have a cash surrender value or has a cash surrender value and the result is greater than or equal to the cash surrender value, then the proposed sale value is set equal to the result. However, if the life insurance policy has a cash surrender value and the result is less than the cash surrender value, then the proposed sale value is set equal to the cash surrender value.

In a further embodiment, the underwriter's computing apparatus may determine the proposed sale value for the life insurance policy taking into account statutory requirements or regulations as imposed by a particular state in which sale of the life insurance policy is to be made. For example, the state's statutory requirements may set minimum percentages for the net death benefit amounts based on various ranges of life expectancy. In this embodiment, the underwriter's computing apparatus may determine a discount value based on the information regarding the life insurance policy, the life expectancy for the individual, and the state's statutory requirements. The underwriter's computing apparatus then subtracts the discount value from the death benefit amount of the life insurance policy to determine the proposed sale value. For example, if the death benefit amount of the life insurance policy is $100,000, the life expectancy of the individual is eighteen (18) months, the remaining premiums over those 18 months are $20,000, there are $10,000 in outstanding loans secured by the life insurance policy, and the state's statutory requirements mandate that the insured individual receive at least 60% of the net death benefit amount (i.e., after reduction for outstanding premiums and loan balances), then the discount value is at most $58,000 (e.g., $20,000+$10,000+(($100,000−$20,000−$10,000)×(0.4))), which would be subtracted from the death benefit amount to render a proposed sale value of at least $42,000.

In yet another embodiment, the underwriter's computing apparatus may alternatively determine the proposed sale value for the life insurance policy taking into account statutory requirements or regulations as imposed by a particular state in which sale of the life insurance policy is to be made. In this embodiment, the underwriter's computing apparatus may determine a percentage of the life insurance policy's net death benefit amount based on the statutory requirements and the life expectancy for the individual to produce a discount percentage. The underwriter's computing apparatus may also determine a total balance of outstanding loans secured by the life insurance policy based on information regarding such outstanding loans as included in the life insurance policy information to produce a total loan balance. The underwriter's computing apparatus may further determine a total balance of premiums remaining to be paid for the life insurance policy based on the life expectancy for the individual and information regarding frequency and amount of premium payments as included in the life insurance policy information to produce a total premium balance. The total loan balance and the total premium balance are then subtracted from the death benefit amount to produce the net death benefit amount. The net death benefit amount is multiplied by the discount percentage to produce the proposed sale value. For example, if the death benefit amount of the life insurance policy is $100,000, the life expectancy of the individual is six (6) months, the remaining premiums over those 6 months are $10,000, there are $10,000 in outstanding loans secured by the life insurance policy, and the state's statutory requirements mandate that the insured individual receive at least 80% of the net death benefit amount (i.e., after reduction for outstanding premiums and loan balances), then the proposed sale value may be no less than $64,000 (e.g., ($100,000−$10,000−$10,000)×(0.8)).

In yet another embodiment, the underwriter's computing apparatus includes a memory, a database, at least one communication network interface, and a processing unit. The computing apparatus may be a single computing device (e.g., computer) or a combination of devices (e.g., server, computer, hard drive with database, and so forth interconnected over a LAN). The memory is operable to store a computer program containing instructions for operating the processing unit. As a result, the memory may be any computer-readable storage medium. The database contains a mortality table. The database may be stored in the memory or in another memory device. The communication network interface interfaces the computing apparatus to one or more communication networks, such as the Internet. The processing unit is operable to execute the computer program and perform various functions in accordance with instructions contained in the computer program.

For example, in one embodiment, the processing unit is operable to receive the insured individual's personal, medical history, and life insurance policy information via the communication network interface and determine, from the database, a mortality rating for the individual based at least on the individual's medical history information. The processing unit is also operable to determine a life expectancy for the individual from the mortality table based at least on the insured's personal information (e.g., age, gender, smoking status) and the mortality rating. The processing unit is further operable to determine a proposed sale value for the life insurance policy based at least on the insured's life expectancy and life insurance policy information. In one embodiment, an interest rate for the potential purchaser is also considered in determining the proposed sale value. Additionally or alternatively, where the sale of life insurance policies is regulated by statute, statutory requirements may be considered in determining the proposed sale value.

Through the communication network interface, the processing unit provides the proposed sale value to the individual or his/her designee and receives an election from the individual to proceed with a sale of the life insurance policy for the proposed sale value. Responsive to the election, the processing unit communicates, via the communication network interface, the life insurance policy information, the insured individual's medical history information, and the proposed sale value to a second computing apparatus operated on behalf of a purchase coordinator to complete the sale of the life insurance policy for at least the proposed sale value.

As used herein and in the appended claims, the term "assisted living facility" shall mean a nursing home, a hospital, a hospice care center, an assisted living center, a long term care facility, or any other facility at which an individual permanently or temporarily resides and receives healthcare or other general living assistance on a regular or continual basis by care providers (e.g., nurses, nurses' aides, volunteers, technicians, therapists, and doctors) employed by or otherwise associated with the facility. The term "assisted living facility" shall further mean any and all employees, representatives, or contractors of such facility or any entity controlled by, under common control with, controlling, affiliated with, or under contract with such facility.

As used herein and in the appended claims, the term "individual" shall mean, as applicable, a living person (e.g., a terminally ill person, a chronically ill person, a physically or mentally disabled person, or an elderly person), a guardian for such person, a family member related to such person, an attorney for such person, or any other person or entity to whom or which (a) the individual has given the authority to make medical or financial decisions on his or her behalf, or (b) authority has been given by court order or operation of law to make medical or financial decisions on behalf of the individual. For example, in connection with any activities of the individual other than directly receiving services from the assisted living facility, the term "individual" refers to any of the foregoing people or entities. On the other hand, in connection with personal, medical history, and life insurance policy information received or provided with respect to an insured person or services provided directly to a person by the assisted living facility, the term "individual" refers only to such person.

As further used herein and in the appended claims, the term "purchase coordinator" shall mean any entity that coordinates the funding or sale of an insured's life insurance policy at a sale price at least as high as a proposed sale price determined by an underwriting entity and coordinates the delivery of a specified amount of proceeds from the sale to a third party, such as a trustee, bound to use the proceeds for the benefit of the insured individual to pay at least part of the individual's assisted living expenses. As additionally used herein and in the appended claims, the term "purchaser" shall mean an entity, such as a financial institution or entity (e.g., bank, savings and loan association or member, or credit union) or a governmental entity that funds the sale price of a life insurance policy of an individual and, in return, takes ownership of the life insurance policy.

Still further, as used herein and in the appended claims, the term "computing apparatus" shall mean any device or combination of devices that includes one or more processing units configured through hardware or software (which includes firmware) to perform any of the functions described. Computing apparatus may include computing devices, servers, and networks (e.g., LANs).

DETAILED DESCRIPTION OF A PREFERRED EMBODIMENT

Figure 1:
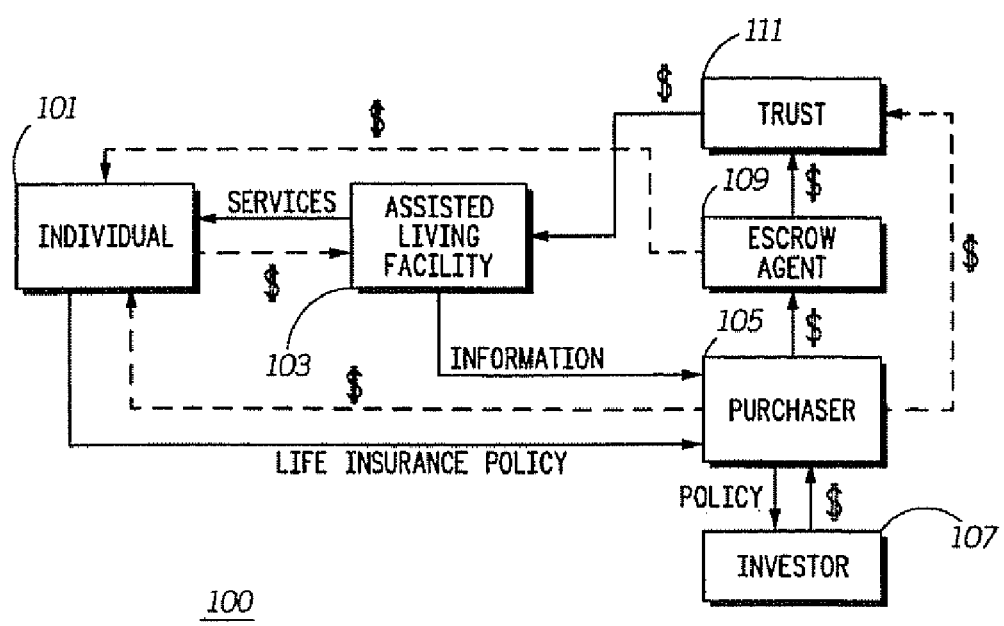
FIG. 1 is a block diagram of a system for increasing liquid assets available to an individual to at least partially fund living expenses of the individual at an assisted living facility in accordance with various embodiments of the present invention.
Figure 2:
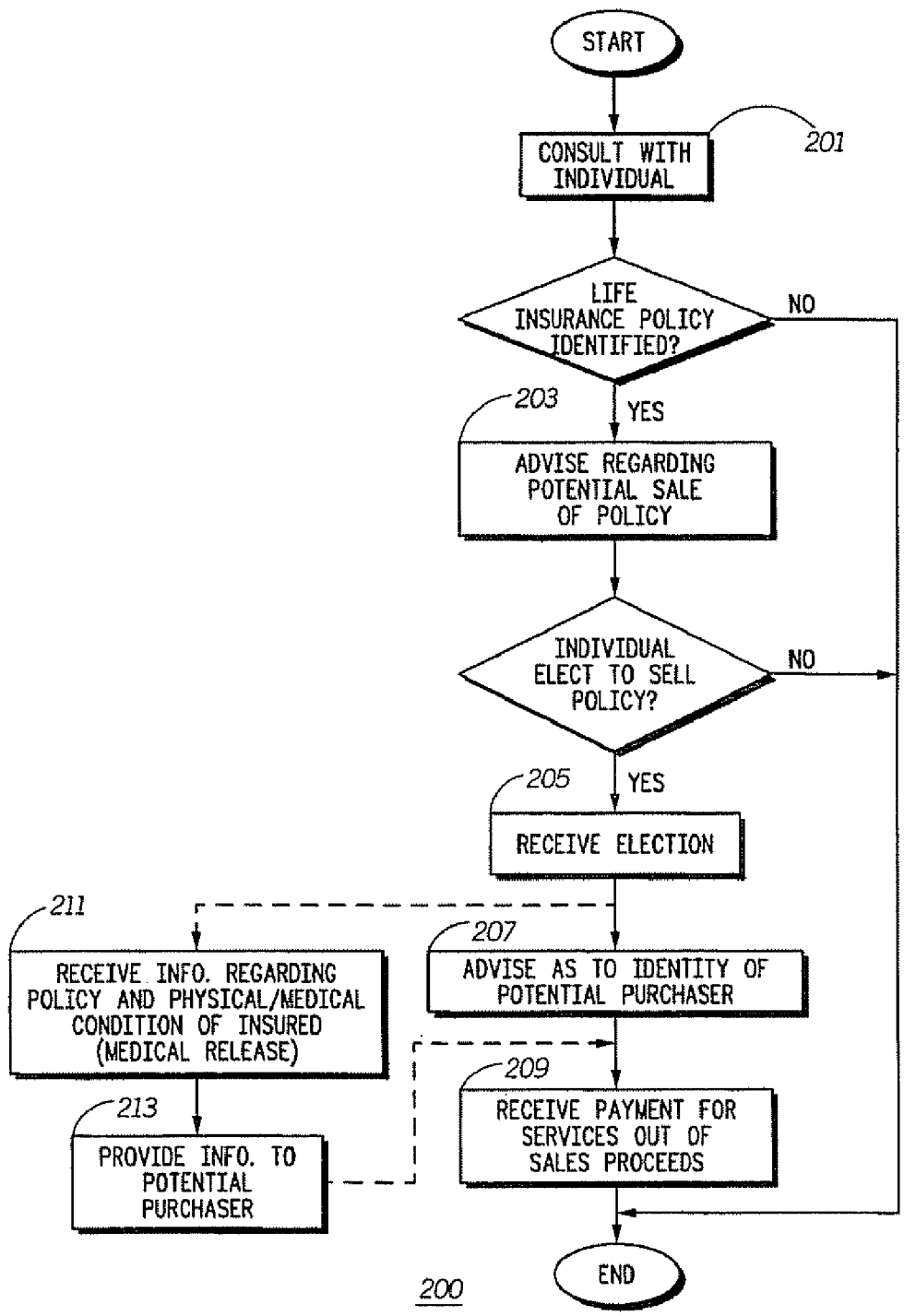
FIG. 2 is a flow diagram of steps executed by an assisted living facility to increase liquid assets of an individual to at least partially fund living expenses of the individual at the assisted living facility in accordance with a first exemplary embodiment of the present invention.
Figure 3:
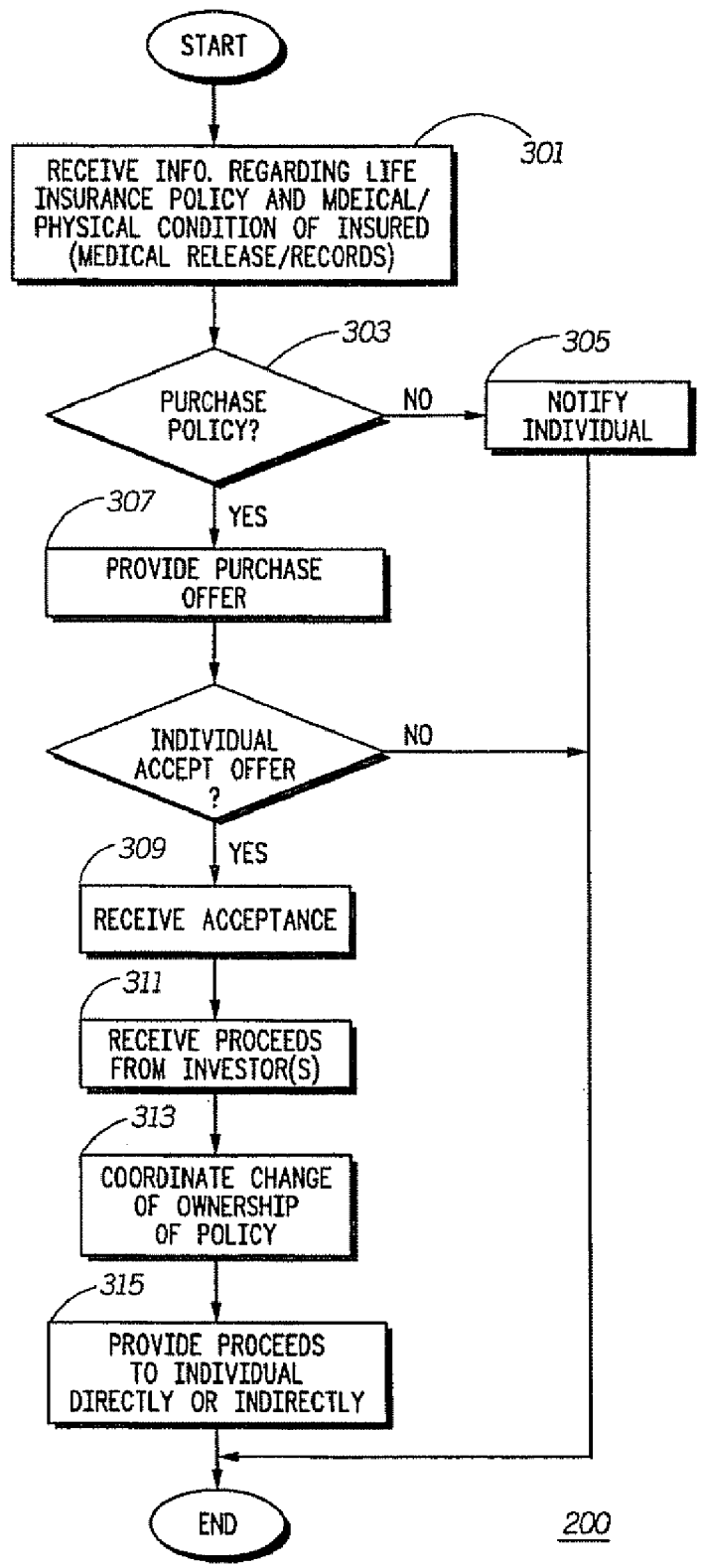
FIG. 3 is a flow diagram of steps executed by a potential purchaser to increase liquid assets of an individual to at least partially fund living expenses of the individual at an assisted living facility in accordance with the first exemplary embodiment of the present invention.
Figure 4:
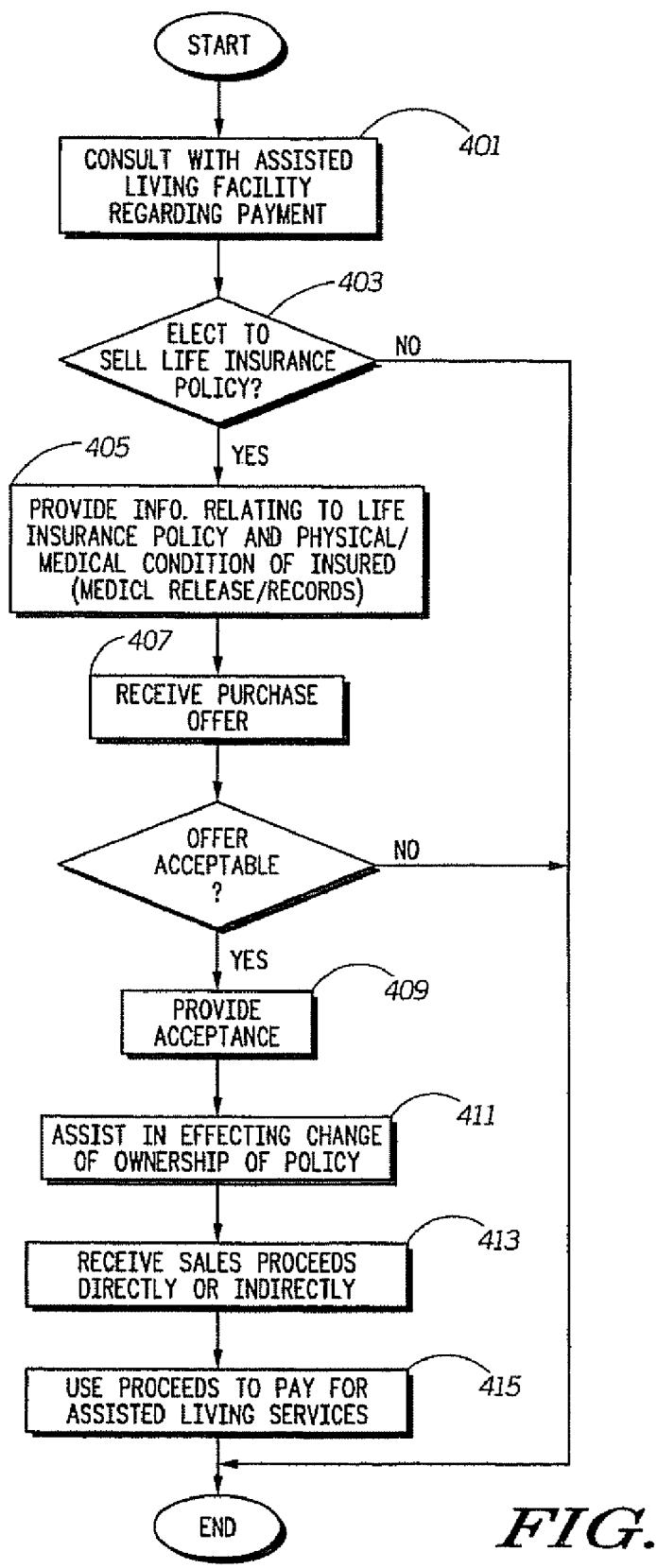
FIG. 4 is a flow diagram of steps executed by an individual to increase his or her liquid assets to at least partially fund his or her living expenses at an assisted living facility in accordance with the first exemplary embodiment of the present invention.
Figure 5:
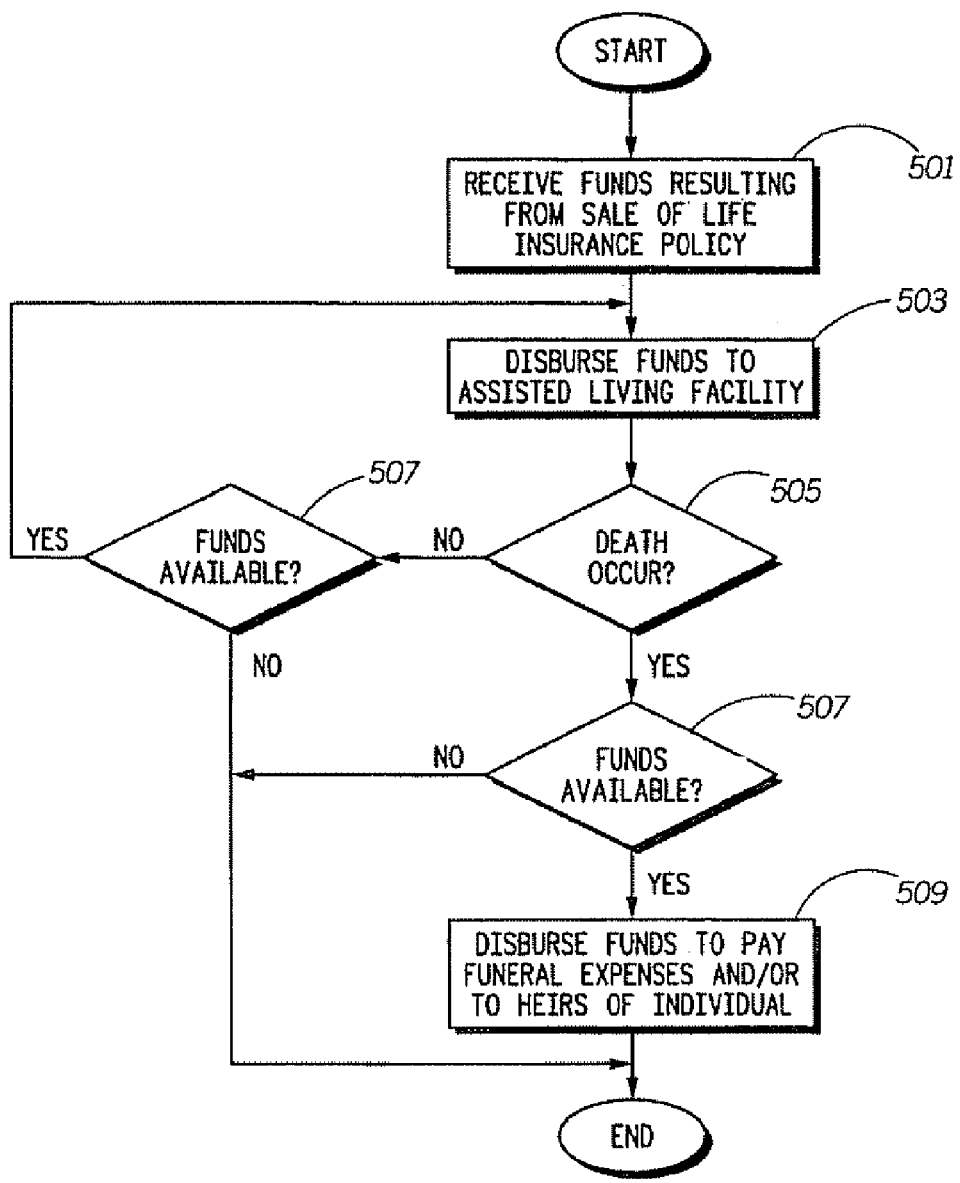
FIG. 5 is a flow diagram of steps executed by a trust to acquire and use liquid assets of an individual to at least partially fund living expenses of the individual at an assisted living facility in accordance with the first exemplary embodiment of the present invention.

Generally, according to one exemplary embodiment, the present invention encompasses a method for increasing liquid assets available to an individual to at least partially fund the individual's living expenses (including the individual's medical and healthcare-related expenses) at an assisted living facility. Preferably, during a consultation between the individual and the assisted living facility (e.g., a facility admissions employee or other representative) prior to admission of the individual to the facility, the facility inquires as to how the individual will be paying for the facility's services. Such inquiry preferably identifies all the liquid and liquidatable assets of the individual to determine whether the individual will be a private pay patient or a government assisted patient. If such an inquiry results in identification of a life insurance policy owned by the individual, the assisted living facility advises or informs the individual as to the availability of selling the life insurance policy to liquidate the life insurance policy for purposes of funding the individual's living expenses. The assisted living facility also preferably advises the individual as to the applicable requirements for obtaining government assistance (e.g., Medicaid), which requirements typically require the individual to divest himself or herself from substantially all his or her liquid or liquidatable assets. If the individual elects to proceed with selling the life insurance policy (e.g., decides to viate the policy), the assisted living facility either advises the individual as to the identity of a potential purchaser (e.g., a viatical settlement provider or a financial institution) or obtains information from the individual related to the life insurance policy (e.g., a copy of the policy) and the physical condition of the insured (e.g., medical history, present diagnosis, and a medical release), and, after receiving written authorization from the individual and/or the insured, as applicable, provides the documents and information to an agent or representative for the potential purchaser.

After obtaining the life insurance policy information and the information relating to the physical condition of the insured (who may or may not be the individual seeking admission to the assisted living facility), the potential purchaser determines whether to purchase the policy based on the received information and preferably other information, such as medical records of the insured. If the potential purchaser decides to purchase the policy (e.g., in the case of viatical settlement, the viatical settlement provider has found or can likely find an investor that will pay a percentage of the face value of the policy in exchange for ownership of the policy), the potential purchaser provides a purchase offer to the individual.

If the individual accepts the offer, the purchaser provides the agreed upon funds directly or indirectly to the individual in exchange for ownership transfer of the life insurance policy to the purchaser or an investor acquiring ownership of the policy through the purchaser. In a preferred embodiment, the purchaser provides the agreed upon funds to an escrow agent. The escrow agent holds the funds until ownership of the life insurance policy has been transferred to the purchaser or the investor, at which time the funds are released to the individual or, more preferably, to a trust established to pay the living expenses of the individual while the individual resides at the assisted living facility. Ultimately, the assisted living facility receives some or all of the proceeds of the policy's sale as consideration for services provided to the individual. If the individual dies before exhausting the sales proceeds, the remaining funds may be used to pay the individual's funeral expenses or may be distributed to one or more heirs of the deceased.

By increasing the liquid assets of an individual in need of assisted living services in this manner, the present invention at least temporarily delays or defers the individual's reliance upon government assistance to pay the individual's assisted living expenses. In contrast to providing a loan or a line of credit to the individual that is secured by a life insurance policy owned by the individual as in the prior art, the present invention requires ownership of the policy to be transferred to a purchaser or an investor obtaining ownership of the policy through the purchaser. Thus, pursuant to the present invention, the funds received by the individual as a result of his or her life insurance policy increases the liquid assets of the individual that are available to pay the individual's assisted living expenses and are considered by the government when determining the individual's qualifications for receiving governmental assistance. Such an approach is in sharp contrast to prior art loan approaches, which provide no increase in worth because the cash received by the policy owner is offset by the indebtedness of the loan. Deferral of individuals' reliance on government assistance can have a substantial, positive impact on state and federal budgets by reducing the overall cost of government-assisted healthcare.

A first embodiment of the present invention can be more fully understood with reference to FIGS. 1-5, in which like reference numerals designate like items. FIG. 1 is a block diagram of a system 100 for increasing the liquid assets of an individual 101 preferably for use in paying at least some of the assisted living expenses of the individual while the individual resides an assisted living facility 103. The system 100 includes at least the assisted living facility 103 and a purchaser 105. In the preferred embodiment, the system 100 further includes at least one investor 107 (e.g., an individual investor or an institutional investor), an escrow agent 109, and a trust 111. In one embodiment, the assisted living facility 103 may also serve as the purchaser 105, the investor 107, the escrow agent 109, and/or the trustee of the trust 111. In another embodiment, the purchaser 105 may also serve as the investor 107, the escrow agent 109, and/or the trustee of the trust 111. In yet another embodiment, the escrow agent 109 may further serve as the trustee of the trust 111. However, in the preferred embodiment, the assisted living facility 103, the purchaser 105, the investor 107, the escrow agent, and the trust 111 are all independent entities.

In the preferred embodiment, the purchaser 105 is a licensed life or viatical settlement company or a financial institution. Alternatively, the purchaser 105 may be a governmental agency or any other person or entity permitted under applicable law to purchase life insurance policies. The escrow agent 109 is preferably a financial institution, an attorney or law firm, an insurance company, or a certified public accountant. Finally, the trustee of the trust 111 is preferably a financial institution, an insurance company, or an attorney.

Operation of the system 100 and execution of the various methods practiced by the system participants 101, 103, 105, 107, 109, 111 occur substantially as follows in accordance with the present invention. Prior to or at the time of admission of an individual to an assisted living facility 103, the facility representative consults (201, 401) with the individual 101 in an attempt to determine whether the individual 101 will be a private pay patient or whether the individual 101 will be applying for government assistance (e.g., Medicaid). During the consultation, the facility representative preferably inquires as to the types and amounts of the individual's assets that may be available to pay for services which are expected to be provided by the facility 103. If the available assets are clearly going to be inadequate to compensate the facility 103 for its anticipated services given the needs of the individual 101, the facility representative preferably advises the individual 101 as to the particular requirements for obtaining government assistance to fund the living expenses of the individual 101 at the assisted living facility 103. Under most circumstances, such requirements include divestment of all or a substantial portion of the liquid and liquidatable assets of the individual 101.

One such liquidatable asset is a life insurance policy owned by the individual 101, whether such policy insures the life of the individual 101 or the life of some other person for whom the individual 101 has an insurable interest. Some states require any person seeking use of Medicaid funds to divest themselves of all life insurance, except for a policy having a face value of no more than $1,500.00. Therefore, as part of the initial consultation between the facility representative and the individual 101, the facility representative preferably inquires as to whether the individual 101 owns any life insurance policies, particularly when the individual 101 is presently, or is anticipated to be, in need of government assistance.

In the event that the assets of the individual 101 include at least one life insurance policy, the facility representative advises (203) the individual 101 as to the availability of potentially selling the individual's life insurance policy. Having received such advice and other information from the facility representative, the individual 101 then determines (403) whether to sell (e.g., viate) the individual's life insurance policy. If the individual 101 elects to sell his or her life insurance policy, the facility representative receives (205) such election from the individual 101 and preferably advises (207) the individual 101 as to the identity of (e.g., refers the individual 101 to) a potential purchaser 105 or, when the assisted living facility 103 itself serves as a potential purchaser 105 (if so permitted under applicable law), so informs the individual 101 as to the facility's purchase conditions. Alternatively, the assisted living facility 103 may serve as a broker or representative for one or more potential purchasers 105 (if so permitted under applicable law). The individual 101 may elect to sell the life insurance policy for a variety of reasons, including the individual's own desire to be a private pay patient; however, in the preferred embodiment, sale of the life insurance policy is elected by the individual 101 based on consultation with the assisted facility representative for purposes of divesting the individual's liquidatable assets to enable the individual 101 to eventually qualify for governmental funding assistance (e.g., Medicaid).

After deciding to proceed with the sale of his or her life insurance policy, the individual 101 preferably provides (405) information relating to the life insurance policy (e.g., policy number, insurer, and copy of the policy), information relating to any medical or physical condition of the insured, and any other information necessary for the potential purchaser 105 to evaluate the viability of selling the individual's life insurance policy to either the potential purchaser 105 or the assisted living facility 103. In the preferred embodiment, the medical-related information supplied by the individual 101 includes any medical records possessed by the individual 101 relating to the insured, an executed medical release from the insured (who may or may not be the individual 101 seeking admission to the assisted living facility 103), and the identities of doctors, hospitals and other care providers that have or may have medical records for the insured to thereby enable the potential purchaser 105 or its representative to obtain such medical records. The information relating to the individual's life insurance policy, the information relating to the medical information of the insured, and any other necessary information is received (211) by the facility representative (e.g., when the assisted living facility 103 acts as any form of conduit between the individual 101 and the potential purchaser 105), or is received (301) by the potential purchaser 105 directly from the individual 101 and/or the insured. When the assisted living facility 103 serves as a conduit (e.g., as representative, broker, or agent for the potential purchaser 105 (if so permitted under applicable law), simply as a courtesy to the individual 101, or otherwise) between the individual 101 and the potential purchaser 105, the assisted living facility 103 provides (213) the information received from the individual 101 and/or the insured to the potential purchaser 105 preferably after receiving written authorization to do so from the individual 101 and/or the insured, as applicable.

After the potential purchaser 105 has received all the necessary information from the individual 101 and/or the insured, the purchaser 105 determines (303) whether to purchase the life insurance policy based on the received information (e.g., when the purchaser is a viatical settlement provider, such provider determines whether viatical settlement of the life insurance policy is available based on the received information). Such a determination preferably comprises evaluating the present condition of the life insurance policy (e.g., face value amount, amount of outstanding loans and past or presently due premiums, contestability of the policy, whether or not the policy has lapsed or been reinstated at any time in its recent history), determining a life expectancy of the person insured by the life insurance policy based on the received medical information, and evaluating the likelihood of locating an investor 107 that would agree to pay a percentage of the face value of the policy, less any outstanding loans and past or presently due premiums, and continue paying the premiums on the life insurance policy. Life expectancy of the insured is preferably computed using conventional actuarial algorithms and tables that take into account the particular medical and/or physical condition of the insured, but may alternatively be computed using any available methodologies. Since life expectancies are commonly computed in the insurance industry, no further details will be provided herein with respect to computing a life expectancy of the insured except to facilitate a better understanding of the invention.

If, after completing its analysis, the potential purchaser 105 decides (303) not to purchase the individual's life insurance policy, the purchaser 105 notifies (305) the individual 101 either directly or indirectly (e.g., through the assisted living facility 103). On the other hand, if the potential purchaser 105 decides (303) to purchase (e.g., through viatical settlement or as otherwise permitted under applicable law) the individual's life insurance policy, the purchaser 105 provides (307) a purchase offer (e.g., a viatical settlement offer in the case of viatical settlement) to the individual 101, either directly or indirectly. The purchase offer preferably includes a financial portion and may also include a non-financial portion. The financial portion of the purchase offer is preferably a percentage of the face value of the life insurance policy, less any outstanding premiums due on and loans secured by the life insurance policy. The non-financial portion of the purchase offer, if included, preferably comprises, by way of example only, a fully paid-up life insurance policy having a face value of one thousand five hundred dollars ($1,500.00), the maximum value permitted under Medicaid regulations. Such a life insurance policy would assist the survivors of the individual 101 in paying the funeral expenses of the individual 101 in the event that the individual 101 dies after exhaustion of all or substantially all the individual's assets, including any sales proceeds received as a result of selling the individual's life insurance policy.

With respect to the financial portion of the purchase offer, percentage of the face value offered by the purchaser 105 may be fixed by state law or may be completely unregulated. In the preferred embodiment, the percentage offered by the potential purchaser 105 complies with the National Association of Insurance Commissioners (NAIC) Viatical Settlements Model Regulations. As a result, the percentage offered, less any outstanding premiums due on and loans secured by the life insurance policy, is eighty percent (80%) when the life expectancy of the insured is less than six (6) months, seventy percent (70%) when the life expectancy of the insured is at least six (6) months, but less than twelve (12) months, sixty-five percent (65%) when the life expectancy of the insured is at least twelve (12) months, but less than eighteen (18) months, and sixty percent (60%) when the life expectancy of the insured is at least eighteen (18) months, but less than twenty four (24) months. In addition, any such offer would preferably be greater than or equal to the cash surrender value or the accelerated death benefit of the life insurance policy. If the life expectancy of the insured is at least twenty-four (24) months, the percentage offered is preferably any percentage that is greater than or equal to the cash surrender value or the accelerated death benefit of the life insurance policy.

To illustrate the preferred settlement offer versus life expectancy relationship, assume that the individual 101 is the insured and has a life insurance policy with a face value of forty thousand dollars ($40,000.00), with no loans received or outstanding premiums owed. Also assume that all applicable requirements of the policy have been met. Further, assume that the individual 101 has been given a life expectancy, for various health reasons, of eleven (11) months. Under these circumstances, the purchaser 105 would offer (307, 407) the individual 101 seventy percent (70%) of the face value, or twenty-eight thousand dollars ($28,000), for the policy. This offered amount would also preferably be (and may have to be, if so required by state law) greater than any cash value or accelerated death benefit provided by or permitted under the policy. Based on this example, the proceeds received from the purchaser 105 could potentially provide private payment for the individual's assisted living expenses for several months, thereby deferring the individual's dependence upon government assistance.

After the purchase offer is made, the individual 101 receives (407) the offer and determines whether to accept it. If the individual 101 accepts the offer, he or she notifies (309, 409) the purchaser 105, directly or indirectly, of the acceptance. Thereafter, the purchaser 105 receives (311) proceeds from the investor(s) 107 to satisfy the offer and coordinates (313) a transfer or change of ownership of the life insurance policy from the individual 101 to the investor(s) 107. The individual assists (411) the purchaser 105 in effecting the change of ownership of the life insurance policy to the investors(s) 107. For example, the individual 101 preferably executes an assignment and/or other documentation as required under the life insurance policy to effect the change in ownership. Since the investor(s) 107 may desire to remain anonymous with respect to the individual 101, the individual 101 preferably assigns the policy to the purchaser 105, which in turn assigns the policy to the investor(s) 107. After the change in ownership of the life insurance policy has been effected, the purchaser 105 provides (315) the proceeds to the individual 101 either directly or, more preferably, indirectly (as discussed in detail below) pursuant to the terms of the accepted offer.

The individual 101 receives (413) the sales proceeds either directly, or more preferably, indirectly, and uses (415) some or all of the proceeds to at least partially pay for the assisted living services provided by the assisted living facility 103. As a result, the assisted living facility 103 preferably receives (209) payment for at least some of the services provided to the individual 101 out of the insurance policy sales proceeds.

In the preferred embodiment, the purchaser 105 provides (315) the sales proceeds to the individual 101 indirectly through the escrow agent 109 and the trust 111. Upon receiving the proceeds from the investor(s) 107, the purchaser 105 deposits the proceeds into an escrow account of the escrow agent 109. The escrow agent 109 is also provided with release instructions for disbursing the proceeds after the individual 101 has transferred ownership of the life insurance policy to the purchaser 105 or the insured(s) 107. The release instructions are preferably set forth in the accepted purchaser offer or another agreement between the purchaser 105 and the individual 101 with respect to selling the individual's life insurance policy. The release instructions preferably require the escrow agent 109 to deposit the settlement proceeds into the trust 111 for the benefit of the individual 101. The trust 111, which also preferably constitutes part of the accepted purchase offer or other agreement entered into between the purchaser 105 and the individual 101 with respect to selling the individual's life insurance policy, is preferably arranged to require the trustee thereof to distribute the proceeds to the assisted living facility 103 to at least partially fund the individual's living expenses (including medical and other healthcare-related expenses) while the individual 101 resides at the assisted living facility 103. The trust 111 is further preferably arranged to require the trustee to distribute any remaining proceeds of the trust 111 first to pay funeral expenses of the individual 101 and then, if any proceeds remain, to one or more heirs of the individual 101 in the event that the individual 101 dies prior to exhaustion of the proceeds.

Therefore, based on the preferred recitations of the escrow release conditions and the trust 111, the escrow agent 109 deposits the proceeds received from the purchaser 105 or the investor(s) 107 into an escrow account with the escrow agent 109. After receiving verification that the individual 101 has transferred ownership of the life insurance policy to either the purchaser 105 or the investor(s) 107 as provided for in the accepted purchase offer, the escrow agent 109 disburses the escrowed proceeds to the trust 111. The trust 111, or a trustee thereof, receives (501) the funds from the escrow agent 109 and, therefore, indirectly from the purchaser 105. After receiving the sales proceeds from the escrow agent 109, the trustee of the trust 111 disburses (503) the proceeds to the assisted living facility 103 over time to pay for or fund the assisted living expenses incurred by the individual 101 while resident at the assisted living facility 103. The payments may be responsive to invoices received from the assisted living facility 103 either directly or indirectly through the individual 101. So long as the individual 101 has not died (505) and funds remain (507) in the trust 111, the trustee continues to disburse (503) the funds to the assisted living facility 103 to pay for the services provided to the individual 101. If the funds are exhausted prior to the individual's death, then the individual 101 preferably applies for governmental assistance so long as the individual 101 otherwise meets any applicable assistance requirements (e.g., adequate divestment of assets). However, in the event that the individual dies (505) prior to exhaustion of the funds in the trust 111, the trustee preferably disburses (509) the funds to pay for the funeral expenses of the individual 101 and, if any funds still remain after such payment, disburses (509) the remaining funds to one or more heirs of the individual 101 pursuant to the terms of the trust 111.

In an alternative embodiment, the release conditions may require the escrow agent 109 to release the sales proceeds directly to the individual 101, or the purchaser 105 may provide the sales proceeds either directly to the trust 111, when established to insure use of the proceeds for payment of the individual's assisted living expenses, or directly to the individual 101. Still further, the accepted purchase offer may require the individual 101 to deposit the sales proceeds received from the purchaser 105 or the escrow agent 109 into the trust 111 to insure use of such proceeds to fund the individual's assisted living expenses. Still, further the accepted purchase offer may simply require the purchaser 105 to act as trustee and disburse the sales proceeds to the assisted living facility 103 over time to pay for the individual's assisted living expenses. In FIG. 1, solid lines are used to indicate the preferred flow of services, money ($), information, and documentation between the individual 101, the assisted living facility 103, the purchaser 105, the investor(s) 107, the escrow agent 109, and the trust 111 in accordance with the present invention. The dashed lines in FIG. 1 are used to indicate exemplary, but not exhaustive, alternative flows and embodiments.

Figure 6:
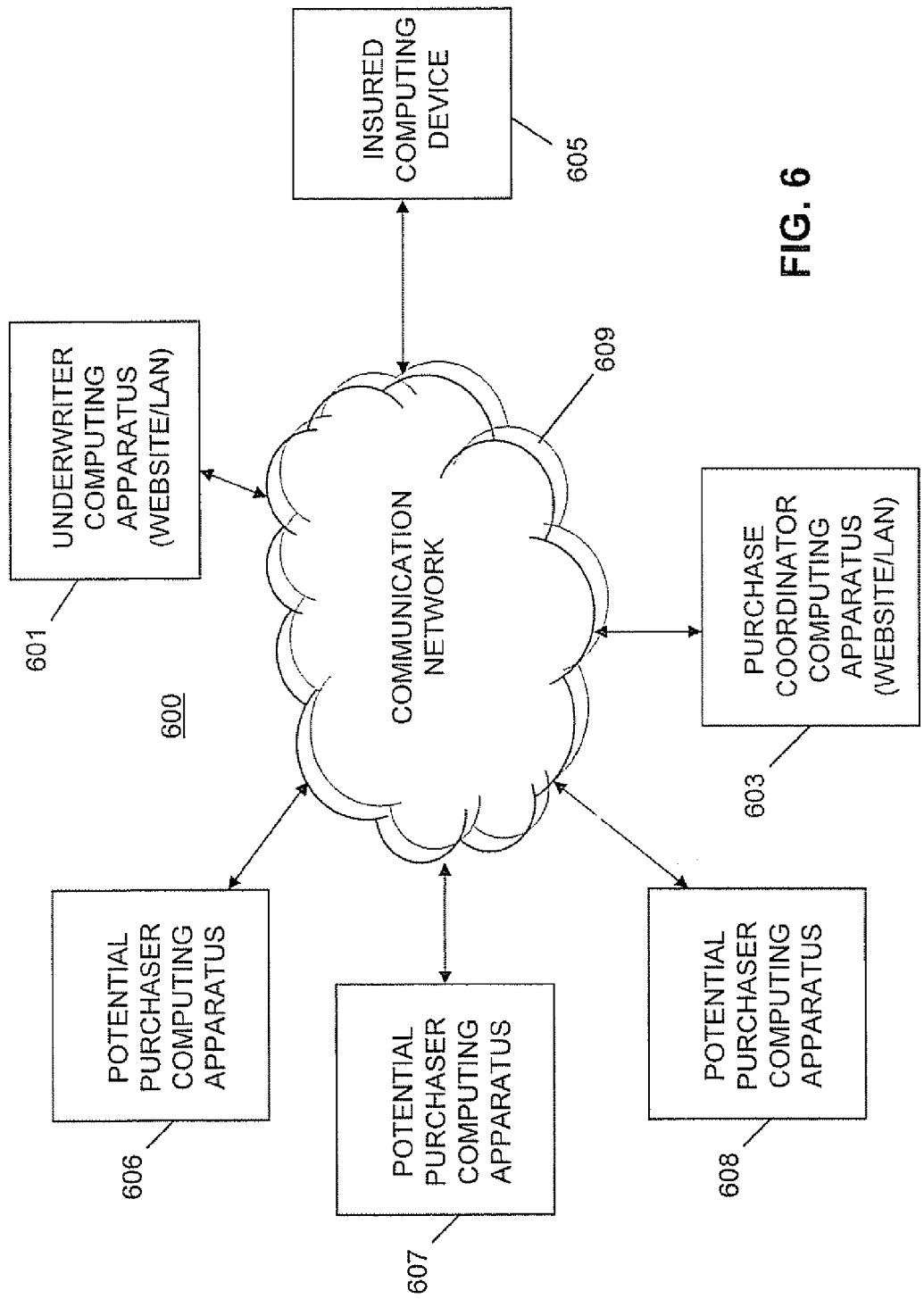
FIG. 6 is a block diagram of a computer system for increasing liquid assets available to an individual to at least partially fund living expenses of the individual at an assisted living facility in accordance with a second exemplary embodiment of the present invention.

A second, computer-implemented embodiment of the present invention can be more fully understood with reference to FIGS. 6-10, in which like reference numerals designate like items. FIG. 6 is a block diagram of an exemplary computing system 600 for increasing liquid assets available to an individual to at least partially fund living expenses of the individual at an assisted living facility. The system 600 includes a computing apparatus 601 operated on behalf of an underwriting entity (e.g., by one or more employees of an insurance company that performs underwriting services) and a computing apparatus 603 operated on behalf of a purchase coordinator (e.g., by one or more employees of an insurance brokerage company, life settlement service provider or any other entity or individual allowed by law). The system 600 may also include computing apparatus 606-608 operated on behalf of potential purchasers of an insured individual's life insurance policy (three shown for illustration purposes) and a computing device 605 operated on behalf of the insured individual. The various computing apparatus and devices 601-608 may be interconnected by one or more communication networks 609 (one shown for illustration purposes).

The underwriter's computing apparatus 601 may be an individual computing device, such as a computer or server, or may be a network of computing and peripheral devices, such as a LAN or other combination of computing devices. In one embodiment, the underwriter's computing apparatus 601 supports a website for use in accordance with the present invention. An exemplary computing apparatus 601 operated on behalf of the underwriting entity is described in more detail below with respect to FIGS. 7 and 9.

Similarly, the purchase coordinator's computing apparatus 603 may be an individual computing device, such as a computer or server, or may be a network of computing and peripheral devices, such as a LAN or other combination of computing devices. In one embodiment, the purchase coordinator's computing apparatus 601 supports a website for use in accordance with the present invention. An exemplary computing apparatus 603 operated on behalf of the purchase coordinator is described in more detail below with respect to FIGS. 8 and 10.

Each potential purchaser's computing apparatus 606-608 may be an individual computing device, such as a computer, PDA, or smart phone. Alternatively, each potential purchaser's computing apparatus 606-608 may be a network of computing and peripheral devices, such as a LAN or other combination of computing devices.

As illustrated in FIG. 1, the computing apparatus and devices 601-608 are communicatively coupled to each other via a communication network 609, which may optionally form part of the computer system 600. The communication network 109 may be a network or a combination of networks that facilitate communication between two or more digital devices. For example, the communication network 609 may be wired (e.g., Ethernet, cable, digital subscriber line (DSL)), wireless (e.g., cellular, satellite, Wi-Fi (e.g., IEEE 802.11a/b/g/n), WiMax (e.g., IEEE 802.16)), or a combination thereof. In one preferred embodiment, the communication network 609 facilitates communications between the computing apparatus and devices 601-608 using the Internet Protocol (IP). Alternatively, the communication network 609 shown generally in FIG. 1 may include separate secure communication networks communicatively coupling (i) the underwriter's computing apparatus 601 with the purchase coordinator's computing apparatus 603, (ii) the purchase coordinator's computing apparatus 603 with the potential purchaser's computing apparatus 606-608, and the (iii) the underwriter's computing apparatus 601 with the insured individual's computing device 605. In one embodiment, such secure networks may be virtual private networks operating over a public network, such as the Internet.

Figure 7:
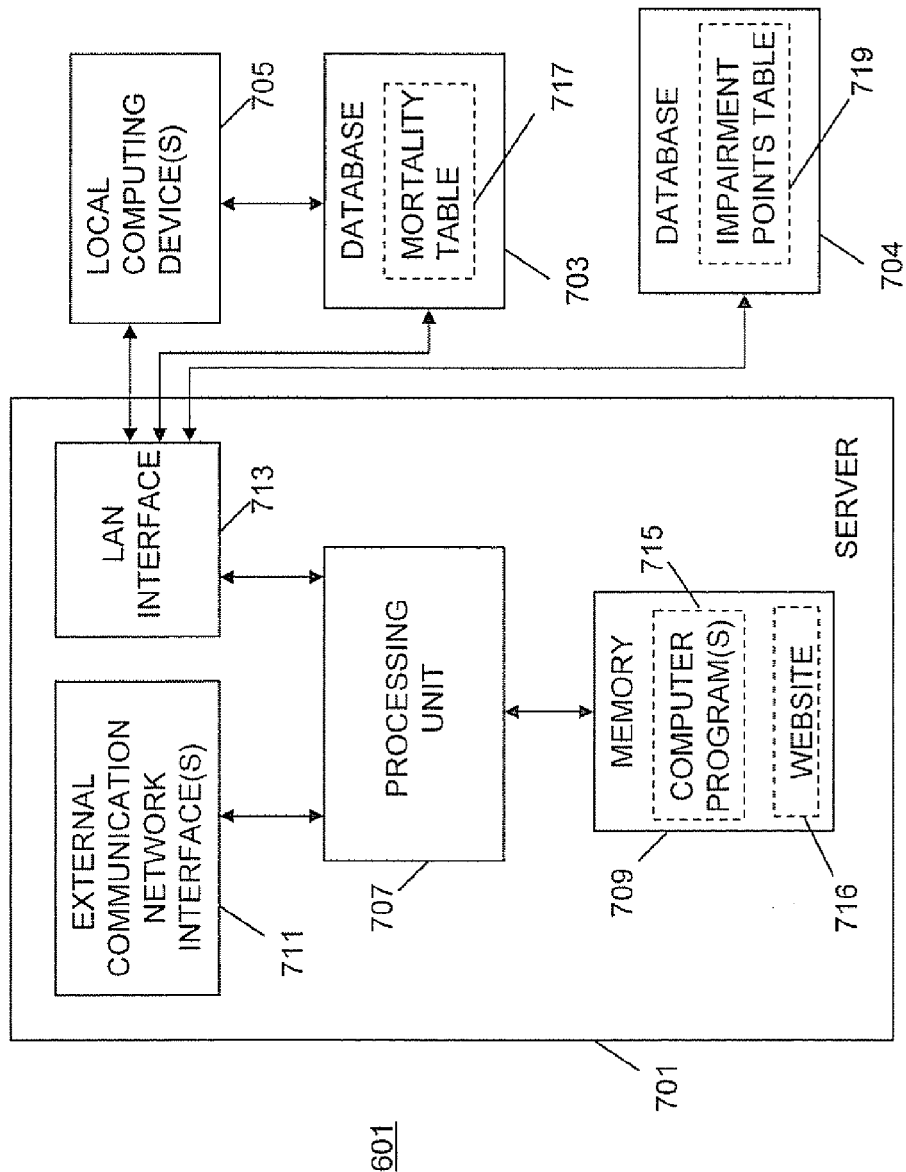
FIG. 7 is an electrical block diagram of a computing apparatus operated on behalf of an underwriting entity as part of the system of FIG. 6.

FIG. 7 is an exemplary electrical block diagram of a computing apparatus 601 operated on behalf of an underwriting entity as part of the computer system 600 of FIG. 6. The exemplary computing apparatus 601 is a LAN that includes a server 701, one or more databases 703, 704 (two shown for illustration purposes), and one or more local computing devices 705 through which employees of the underwriting entity or, equivalently, underwriter interface with the server 701 and/or the database 703. In one embodiment, the underwriting entity may be an insurance company or any other entity in the business of determining life expectancies itself or on behalf of a client.

The exemplary server 701 includes, inter alia, a processing unit 707, memory 709, one or more external communication network interfaces 711 (one shown for illustration purposes), and a LAN interface 713. In an alternative embodiment, the server 701 may also include the databases 703-704. Where the server 701 and the databases 703, 704 reside on the LAN, the server 701 may communicate with the databases 703, 704 via the LAN interface 713 (e.g., an Ethernet interface or a Wi-Fi interface). On the other hand, when one or more of the databases 703, 704 is external to the LAN, the server 701 may communicate with the databases 703, 704 via the external communication network interface 711. The communication network interface(s) 711 includes appropriate transceiver and/or modem functionality to facilitate communication over the portions of the communication network(s) 609 to which the server 701 is connected. For example, if the server 701 is connected to a T1 trunked line, the communication network interface 711 may be a T1 trunk interface card. Alternatively or additionally, where the server 701 is connected to a wide area wireless network (e.g., a cellular or satellite network), the communication network interface 711 may include a transceiver configured to operate on the wide area wireless network. The communication network interface 711 may alternatively or additionally be a cable interface, a digital subscriber line (DSL) interface, a fiber optic interface, a hybrid fiber-coaxial (HFC) interface, or a short-range wireless interface (e.g., Wi-Fi, Wi-Max, Bluetooth, or any other shorter-range wireless interface).

The processing unit 707 may be a microprocessor, a microcontroller, a digital signal processor (DSP), a central processing unit (CPU), a state machine, logic circuitry, or any other device or combination of devices that processes information based on one or more computer programs 715 stored in the memory 709. One of ordinary skill in the art will appreciate that the processing unit 707 can be implemented using multiple processors as may be required to handle the server processing requirements of the present invention and the various other included functions of the server 701. One of ordinary skill in the art will further recognize that when the processing unit 707 has one or more of its functions performed by a state machine or logic circuitry, the memory containing the corresponding operational instructions can be embedded within the state machine or logic circuitry as opposed to being external to the processing unit 707, as is the internal memory 709 illustrated in FIG. 7. In one embodiment, the processing unit 707 controls substantially all the functionality of the server 701.

The memory 709 stores various information used by the processing unit 707 during operation of the server 701. For example, the memory 709 may store one or more computer programs 715 that control operation of the server 701 when executed by the processing unit 707. Thus, the memory 709 may function as a type of computer-readable storage medium. Additionally, when a database 703, 704 is included within the server 701, the database 703, 704 may reside within the memory 709. The memory 709 may be separate from the processing unit 707 as depicted in FIG. 7 or be integrated into the processing unit 707. The memory 709 may include random access memory (RAM), read-only memory (ROM), flash memory, electrically erasable programmable read-only memory (EEPROM), and/or various other forms of memory as are well known in the art. It will be appreciated by one of ordinary skill in the art that the various memory components can each be a group of separately located memory areas in the overall or aggregate device memory and that the device memory may include one or more individual memory elements. The memory 709 may be further supplemented by an external computer-readable storage medium or other memory device (not shown), such as a digital versatile disk (DVD), a compact disc read-only memory (CD-ROM), flash memory, or a hard drive. To accommodate use of an external memory device, the server 701 may include an appropriate external memory interface (not shown), such as a CD-ROM drive, Universal Serial Bus (USB) drive, or other appropriate memory interface.

The computer programs 715 stored in the memory 709, when executed by the processing unit 707, cause the processing unit 707 to perform a variety of functions in accordance with embodiments of the present invention. For example, in one embodiment, one or more of the computer programs 715 may implement a website 716 accessible by the purchase coordinator's computing apparatus 603 and/or the insured individual's computing device 605 via a communication network 609. The insured individual (or his/her designee) and the purchase coordinator may then access and supply various information to the underwriter's server 701, as applicable in accordance with the present invention.

Database 703 stores a mortality table 717 used by the processing unit 701 to determine life expectancies for insured individuals in accordance with the present invention. The mortality table 717 stores life expectancies based on a variety of information, such as age, gender, smoking status, and mortality rating. In one embodiment, the mortality table 717 is derived at least partially from empirical data collected by the underwriting entity regarding a large sample of deceased individuals (e.g., individuals for which the underwriting entity had previously underwritten life insurance policies). In one embodiment, the empirical data includes (a) ages of the individuals at death and at times of health impairment evaluation on behalf of the underwriting entity (e.g., by a doctor retained by the underwriting entity), (b) indications of health impairments (e.g., diseases or other health conditions) and associated severities at the time of health impairment evaluation on behalf of the underwriting entity, and (c) medical scores assigned to the health impairments by the underwriting entity. The medical scores are effectively point values assigned to a variety of health impairments based on severities of the health impairments, such that more severe health impairments are assigned higher point values than less severe health impairments. The medical scores or assigned point values are typically referred to as "debits." In one embodiment, the point values for various health impairments based on severities of the impairments are stored in an impairment points table 719 of another database 704. The points assigned to health impairments and stored in the impairment points table 719 are used to determine the mortality rating for an individual having one or more health impairments at the time the individual elects to sell his or her life insurance policy as described in more detail below. In an alternative embodiment, the mortality table 717 may be any conventional actuary table used in the health and/or life insurance fields to determine life expectancy.

Each local computing device 705 may be any device capable of processing data, communicating data to, and receiving data from the server 701, the database 703, 704, and/or the communication network 609. Accordingly, each local computing device 705 may be a smart phone, a cellular phone, a PDA, a netbook computer, a notebook or laptop computer, a desktop computer, a palmtop computer, or any other networked or Internet-accessible device.

Figure 8:
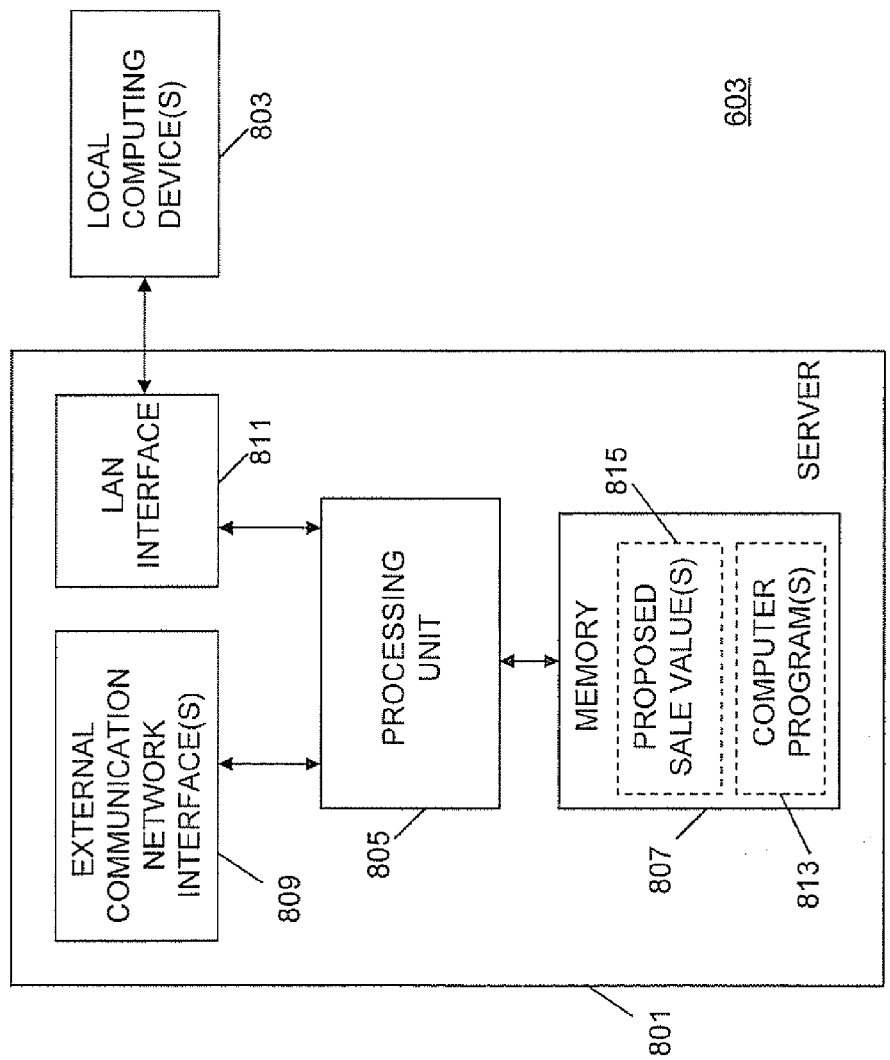
FIG. 8 is an electrical block diagram of a computing apparatus operated on behalf of a purchase coordinator as part of the system of FIG. 6.

FIG. 8 is an exemplary electrical block diagram of a computing apparatus 603 operated on behalf of a purchase coordinator as part of the computer system 600 of FIG. 6. The exemplary computing apparatus 603 is a LAN that includes a server 801 and one or more local computing devices 803 through which employees of the purchase coordinator interface with the server 801. In one embodiment, the purchase coordinator may be an insurance brokerage company or life settlement service provider.

The exemplary server 801 includes, inter alia, a processing unit 805, memory 807, one or more external communication network interfaces 809 (one shown for illustration purposes), and a LAN interface 811. Where the server 701 and the local computing devices 803 reside on the LAN, the server 801 may communicate with the local computing devices 803 via the LAN interface 811 (e.g., an Ethernet interface or a Wi-Fi interface). The communication network interface(s) 809 includes appropriate transceiver and/or modem functionality to facilitate communication over the portions of the communication network(s) 609 to which the server 801 is connected. For example, if the server 801 is connected to a T1 trunked line, the communication network interface 809 may be a T1 trunk interface card. Alternatively or additionally, where the server 801 is connected to a wide area wireless network (e.g., a cellular or satellite network), the communication network interface 809 may include a transceiver configured to operate on the wide area wireless network. The communication network interface 809 may alternatively or additionally be a cable interface, a DSL interface, a fiber optic interface, an HFC interface, or a short-range wireless interface (e.g., Wi-Fi, Wi-Max, Bluetooth, or any other shorter-range wireless interface).

The processing unit 805 may be a microprocessor, a microcontroller, a DSP, a CPU, a state machine, logic circuitry, or any other device or combination of devices that processes information based on one or more computer programs 813 stored in the memory 807. One of ordinary skill in the art will appreciate that the processing unit 805 can be implemented using multiple processors as may be required to handle the server processing requirements of the present invention and the various other included functions of the server 801. One of ordinary skill in the art will further recognize that when the processing unit 805 has one or more of its functions performed by a state machine or logic circuitry, the memory containing the corresponding operational instructions can be embedded within the state machine or logic circuitry as opposed to being external to the processing unit 805, as is the internal memory 807 illustrated in FIG. 8. In one embodiment, the processing unit 805 controls substantially all the functionality of the server 801.

The memory 807 stores various information used by the processing unit 805 during operation of the server 801. For example, the memory 807 may store one or more computer programs 813 that control operation of the server 801 when executed by the processing unit 805. Thus, the memory 807 may function as a type of computer-readable storage medium. The memory 807 may be separate from the processing unit 805 as depicted in FIG. 8 or be integrated into the processing unit 805. The memory 807 may include RAM, ROM, flash memory, EEPROM, and/or various other forms of memory as are well known in the art. It will be appreciated by one of ordinary skill in the art that the various memory components can each be a group of separately located memory areas in the overall or aggregate device memory and that the device memory may include one or more individual memory elements. The memory 807 may be further supplemented by an external computer-readable storage medium or other memory device (not shown), such as a digital DVD, CD-ROM, flash memory, or a hard drive. To accommodate use of an external memory device, the server 801 may include an appropriate external memory interface (not shown), such as a CD-ROM drive, USB drive, or other appropriate memory interface.

The computer programs 813 stored in the memory 807, when executed by the processing unit 805, cause the processing unit 805 to perform a variety of functions in accordance with embodiments of the present invention. For example, in one embodiment, one or more of the computer programs 813 may implement a website accessible by the potential purchasers' computing apparatus 606-608 via a communication network 609. The potential purchasers may then access and supply various information to the purchase coordinator's server 801, as applicable in accordance with the present invention.

In accordance with the present invention, the memory 807 may further store proposed sale values 815 and other information relating to the sale of a life insurance policy as may be received from the underwriter's computing apparatus 601. The proposed sale values 815 may be communicated to computing apparatus 606-608 for potential purchasers as described in more detail below.

Each local computing device 803 may be any device capable of processing data, communicating data to, and receiving data from the server 801 and/or the communication network 609. Accordingly, each local computing device 705 may be a smart phone, a cellular phone, a PDA, a netbook computer, a notebook or laptop computer, a desktop computer, a palmtop computer, or any other networked or Internet-accessible device.

Figure 9:
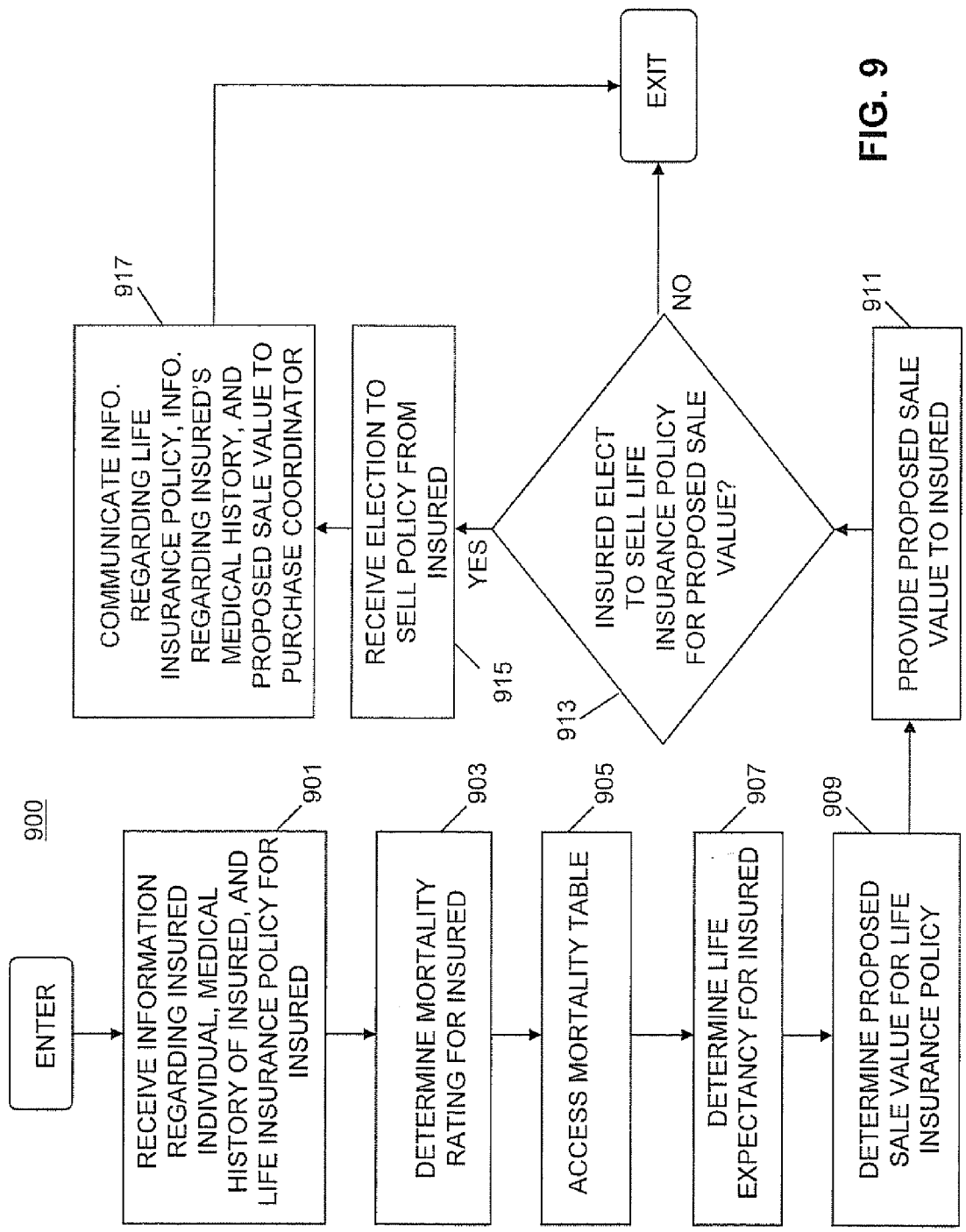
FIG. 9 is a flow diagram of steps executed by a computing apparatus operated on behalf of an underwriting entity to increase liquid assets available to an individual to at least partially fund living expenses of the individual at an assisted living facility in accordance with the second exemplary embodiment of the present invention.

Operation of the computing system 600 of FIG. 6 will now be described with reference to FIGS. 6-10. In that regard, operation of the exemplary underwriter computing apparatus 601 will be described first. FIG. 9 is a flow diagram 900 of steps executed by the underwriter computing apparatus 601 to increase liquid assets available to an individual to at least partially fund living expenses of the individual at an assisted living facility in accordance with an exemplary embodiment of the present invention. The underwriter's computing apparatus 601 receives (901) personal information regarding the individual, information regarding a medical history of the individual, and information regarding a life insurance policy for the individual. For example, in one embodiment, the computing apparatus 601 receives inputs to a questionnaire containing questions relating to the various information required by the underwriter. Such questions may request identification information for the individual (e.g., name, birth date, residence address, social security number, gender, smoking status, and so forth), information regarding the individual's medical history (e.g., current and past health impairments, such as diseases, injuries, mental health conditions, and so forth, the severity levels of such health impairments (e.g., stage of cancer or category of pulmonary disease (e.g., chronic versus acute)), daily living capabilities and routines, such as whether the individual gets regular exercise and how much, and other health-related information), and information regarding the life insurance policy to be sold (e.g., death benefit amount, issue date, frequency and amount of premium payments, outstanding loans secured by the life insurance policy and associated balances, and cash surrender value, if any). In one embodiment in which the underwriter's computing apparatus 601 includes a server 701 that hosts a website 716, the questionnaire may be answered by the individual or his/her designee (e.g., a relative of the individual, a guardian of the individual, or an attorney for the individual) via the website 716 after the individual or the designee accesses the website 716 over the communication network 609 (e.g., the Internet) form the individual's/designee's computing device 605. Where the individual elects to investigate the sale of a life insurance policy in response to a meeting with personnel of an assisted living facility as discussed above, the individual may designate an employee of the assisted living facility (e.g., an admissions coordinator) as his or her designee for submitting the individual's personal, medical history, and life insurance policy information to the underwriter's computing apparatus 601 (e.g., via the website 716). The information received from the individual may be stored in the memory 709 of the underwriter's computing apparatus 601.

After receiving the individual's personal, medical history, and life insurance policy information, the processing unit 707 of the underwriter's computing apparatus 601 retrieves the received medical history information and determines (903) a mortality rating for the insured individual. To determine the mortality rating according to one embodiment, the underwriter's computing apparatus 601 accesses the impairment points database 719 or an equivalent database to determine point values assigned to the health impairments possessed by the individual and identified by the individual as part of the individual's medical history information. For example, processing unit 707 performs a lookup function in the impairment points database 719 to determine the point values for the individual's health impairments. As noted above, point values (e.g., debits) are preferably assigned to a variety of health impairments based on the severities of the health impairments such that more severe health impairments are assigned higher point values than less severe health impairments. The point values are then stored in a database, such as the impairment points database 719. For example, chronic emphysema would have a higher point value than acute emphysema. Similarly, stage 4 cancer would have a higher point value than stage 1 cancer.

After determining the individual point values for the insured individual's health impairments, the processing unit 707 of the underwriter's computing apparatus 601 may sum the determined point values to obtain the mortality rating. The sum may be a direct sum or a weighted sum. Alternatively, the mortality rating may be determined by executing some other function on the determined point values. The mortality rating is essentially a metric that provides an indication of the overall health (or lack thereof) of the insured individual. For example, if the individual is an 80 year old, male, non-smoker with diabetes and stage 2 lymphoma, where impairment points database 719 indicates that diabetes in men age 80-85 is assigned a point value of 30 and stage 2 lymphoma in men age 80-85 is assigned a point value of 175, the determined mortality rating would be 205 points using a direct sum approach for determining the mortality rating.

After determining the mortality rating for the individual, the processing unit 707 of the underwriter's computing apparatus 601 accesses (905) the mortality table 717 and determines (907) a life expectancy for the individual. As discussed above, the mortality table 717 includes life expectancies for categories of individuals based on several factors, such as mortality rating, age, gender, and smoking status. According to one embodiment of the present invention, processing unit 707 retrieves from memory 709 the personal information of the individual from which the individual's age, gender, and smoking status are determinable. For example, processing unit 707 may retrieve the individual's birth date, gender, and smoking status from memory 709 and compute the individual's age based on the current date. Based on the retrieved information, processing unit 707 categorizes the individual into a category of the mortality table based on the individual's age, gender, smoking status, and mortality rating. Processing unit 707 then determining the life expectancy for the individual from the mortality table as a life expectancy for the category into which the individual was categorized. Continuing the 80 year old, male, non-smoker example discussed above, the mortality table 717 may include categories for smoking and non-smoking males and females of various ages with various mortality ratings, and provide life expectancies for all the categories. Based on the retrieved information for the individual (80 years old, male, non-smoker status) and the mortality rating (205 points), processing unit 707 determines from the mortality table 717 that the individual's life expectancy is 2.6 years.

After the life expectancy has been determined, the processing unit 707 of the underwriter's computing apparatus 601 determines (909) a proposed sale value for the life insurance policy based at least on the life expectancy and the life insurance policy information. In particular, processing unit 707 applies a discounting algorithm forming part of the computer programs 715 to determine the proposed sale value as a portion of the death benefit amount (e.g., face value) of the life insurance policy. According to one embodiment, processing unit 707 determines a discount value based on the life insurance policy information (e.g., total amount of outstanding premiums, total amount of outstanding loans, death benefit amount, and cash surrender value), the life expectancy for the individual, and an expected interest rate for a successful purchaser and subtracts the discount value from the death benefit amount to produce the proposed sale value. For example, if the individual has a life expectancy of 3.0 years and owns a policy with a death benefit of $100,000, the policy premiums for the next 3.0 years are $7,500, there are no outstanding loans secured by the life insurance policy, and the expected interest rate is 10%, then the discount value may be $30,685. Subtracting the discount value from the death benefit amount, the proposed sale value is $69,315 (e.g., net present value of $100,000 death benefit minus net present value of $7,500 premiums paid over 3.0 years).

According to an alternative embodiment, processing unit 707 may determine the proposed sale value taking into account an expected interest rate for the purchaser, as well as the cash surrender value of the life insurance policy (e.g., where the life insurance policy is a permanent life insurance policy, such as a whole life policy, variable whole life policy, or universal life policy). For example, according to this embodiment, processing unit 707 determines a percentage of the policy's death benefit amount (discount percentage) based on the expected interest rate for the purchaser and the life expectancy of the individual. For example, if the expected interest rate is 10% annually and the life expectancy of the individual is three years, then the discount percentage is 24.5%. Additionally, processing unit 707 determines a total balance of outstanding loans secured by the life insurance policy based on the information regarding such loans received from the individual (e.g., as part of the individual's responses to the questionnaire). Processing unit 707 further determines a total balance of premiums remaining to be paid for the life insurance policy based on the life expectancy for the individual and the premium-related information received from the individual (e.g., as part of the individual's responses to the questionnaire). For example, if the individual's life expectancy is three years, the policy premium is due quarterly, and the average quarterly premium for the next three years is $2,000, then the total balance of premiums may be determined to be $24,000.

Having determined the total outstanding loan balance the total remaining premium balance and the discount percentage, processing unit 707 subtracts the total loan balance and the total premium balance from the policy's death benefit amount to produce a net death benefit amount and multiplies the net death benefit amount by the discount percentage to produce a reference sale value. If the life insurance policy has a cash surrender value (which may readily determined from the policy information provided by the individual), processing unit 707 compares the reference sale value to the cash surrender value and sets the proposed sale value equal to the reference sale value if the reference sale value is greater than or equal to the cash surrender value (or some multiplier thereof if so required by state statute). On the other hand, if reference sale value is greater than or equal to the cash surrender value (or the multiplier thereof if required by statute), then processing unit 707 sets the proposed sale value equal to the cash surrender value. If the life insurance policy does not have a cash surrender value, then processing unit 707 sets the proposed sale value equal to the reference sale value.

According to yet another embodiment, processing unit 707 may determine the propose sale value taking into account statutory requirements for a particular state in which sale of the life insurance policy is to be made. According to this embodiment, processing unit 707 determines a discount value based on the statutory requirements, the life insurance policy information, and the life expectancy for the individual. For example, as discussed in detail above, state statutes may require particular portions of the death benefit amount (or net death benefit amount where there are outstanding loans and/or remaining premiums due) to be paid to an insured individual as part of a life settlement where the life expectancy of the individual is two years or less. For instance, if the individual's life expectancy is one year, the death benefit amount is $100,000, there are no outstanding loans or premiums due, and state statute requires that persons with one year life expectancy receive at least 65% of the death benefit amount, then the maximum discount value would be $35,000 (35% of $100,000). Processing unit 707 then subtracts the discount value from the death benefit amount to determine the proposed sale value. The cash surrender value of the life insurance policy may also be taken into account in this embodiment, such that processing unit 707 compares the computed proposed sale value to the cash surrender value. If the cash surrender value of the policy is greater than the computed sale value, the proposed sale value may be set equal to the cash surrender value; otherwise, the computed value is used as the proposed sale value.

According to a further embodiment, processing unit 707 may determine the propose sale value taking into account statutory requirements and outstanding loans and premiums. In this case, processing unit 707 determines a percentage of a net death benefit amount based on the statutory requirements and the life expectancy for the individual to produce a discount percentage. Processing unit 707 also determines a total balance of outstanding loans secured by the life insurance policy and a total balance of premiums remaining to be paid for the life insurance policy based on the policy information supplied by the individual or his/her designee (e.g., as part of the individual's responses to the questionnaire). Processing unit 707 subtracts the total loan balance and the total premium balance from the policy's death benefit amount to produce a net death benefit amount and multiplies the net death benefit amount by the discount percentage to produce the proposed sale value. For example, if the individual's life expectancy is one year, the death benefit amount is $100,000, there is $30,000 in outstanding loans, there are anticipated to be four $2,000 premiums due (based on the life expectancy), and state statute requires that persons with one year life expectancy receive at least 65% of the net death benefit amount, then the minimum proposed sale value would be $40,300 (65% of ($100,000-$38,000)). The cash surrender value of the life insurance policy may also be taken into account in this embodiment, such that processing unit 707 compares the computed proposed sale value to the cash surrender value. If the cash surrender value of the policy is greater than the computed sale value, the proposed sale value may be set to the cash surrender value; otherwise, the computed value is used as the proposed sale value.

After the proposed sale value has been determined, the processing unit 707 of the underwriter's computing apparatus 601 provides (911) the proposed sale value to the insured individual. In one embodiment in which the underwriter's computing apparatus 601 hosts a website 716, the underwriter's computing apparatus 601 (e.g., through operation of processing unit 707) notifies the individual or his/her designee (e.g., relative, guardian, attorney, or assisted living facility personnel) that the proposed sale value has been determined (e.g., by an email communication) and requests the individual to go to the website 716 to view the information. In such a case, the underwriter's computing apparatus 601 provides the proposed sale value to the individual and his or her computing device 605 via the website 716 over the communication network 609. Alternatively, the proposed sale value may be communicated to the individual via any other means, such as email, text message, and so forth.

After receiving the proposed sale value, the individual determines whether or not to proceed with the sale of the life insurance policy and notifies the underwriter's computing apparatus 601, such as via the website 716. The processing unit 707 of the underwriter's computing apparatus 601 regularly monitors (913) for receipt of an election from the individual. If the individual elects to proceed with the sale of the life insurance policy, processing unit 707 receives (915) the election to proceed on behalf of the individual (i.e., from the individual or his/her designee), such as via the website 716. Responsive to receiving the election to proceed, processing unit 707 communicates (917) various information to the purchase coordinator's computing apparatus 603 via the communication network 609. The communicated information may include the life insurance policy information, some or all of the personal information of the individual, the individual's medical history information, and the proposed sale value. If necessary to comply with federal privacy laws, the underwriting entity may obtain an applicable HIPAA release from the individual prior to communicating the information to the purchase coordinator.

One of ordinary skill in the art will readily recognize that the operations of processing unit 707 described above may be performed automatically by the processing unit 707 based on one or more stored computer programs 715 or may be performed at least partially in response to inputs from underwriter personnel received via the local computer(s) 705.

Figure 10:
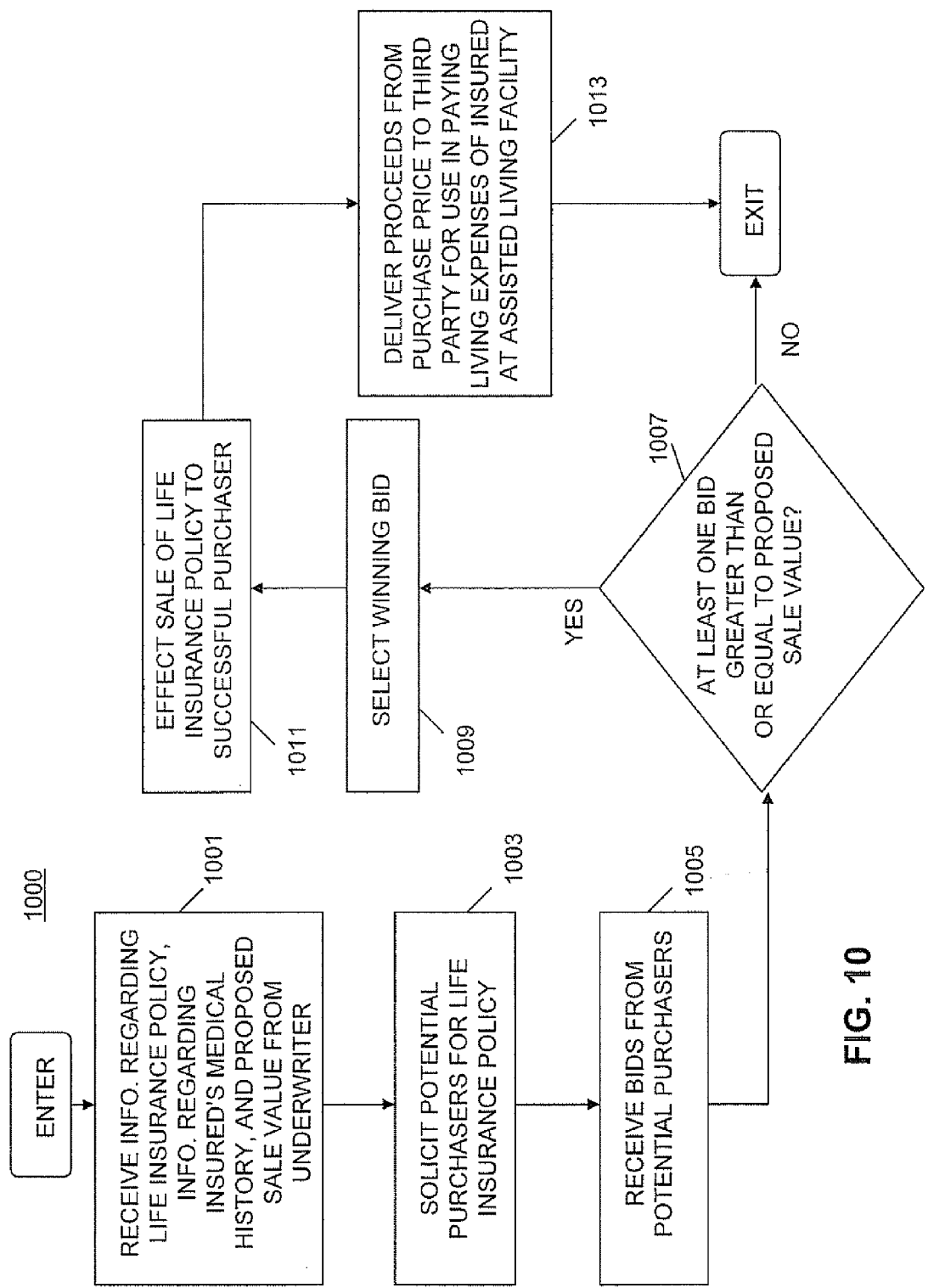
FIG. 10 is a flow diagram of steps executed by a purchase coordinator to increase liquid assets available to an individual to at least partially fund living expenses of the individual at an assisted living facility in accordance with the second exemplary embodiment of the present invention.

FIG. 10 is a flow diagram 1000 of steps executed by the purchase coordinator to increase liquid assets available to an individual to at least partially fund living expenses of the individual at an assisted living facility in accordance with an exemplary embodiment of the present invention. According to the logic flow, the purchase coordinator's computing apparatus 603 receives (1001) a set of information from the underwriter's computing apparatus 601. As discussed above, the information may include the individual's life insurance policy information, some or all of the personal information of the individual, the individual's medical history information, and the proposed sale value for the life insurance policy. If necessary to comply with federal privacy laws, the received information may also include an executed HIPAA release. The processing unit 805 of the purchase coordinator's computing apparatus 603 stores the information, including the proposed sale value 815, in memory 807.

Responsive to receiving the information, the purchase coordinator's computing apparatus 603 (e.g., through operation of its processing unit 805) solicits (1003) potential purchasers for the life insurance policy. For example, in one embodiment, the purchase coordinator's computing apparatus 603 may host a secure website on which the purchase coordinator posts life insurance policies for sale and solicits bids. The postings may be for fixed sale amounts at the proposed sale value or another predetermined higher value (e.g., the proposed sale value plus an appropriate mark-up to benefit the purchase coordinator and/or the underwriting entity) or may be in the form of an auction (optionally with a reserve in the amount of the proposed sale value or some other predetermined value). In such an embodiment, potential purchasers (investors) may register with the purchase coordinator and establish an account on the website. The accounts may include security measures, such as a login and password. Alternatively, the purchase coordinator's computing apparatus 603 may send messages to computing apparatus 606-608 of potential purchasers using conventional messaging techniques, such as email, to inform the purchasers about the new life insurance policy for sale. Additionally, communications with the website or otherwise with the purchase coordinator's computing apparatus 603 may be secure, such as through use of conventional encryption techniques. Further, if necessary under federal law, the purchase coordinator shall obtain, optionally with the assistance of the underwriting entity, an executed HIPAA release to enable the purchase coordinator to share the medical history information of the individual with the potential purchasers. Still further, the purchase coordinator may also obtain an authorization for verification of coverage for the life insurance policy information execute by the individual or his legal representative to enable the purchase coordinator and/or potential purchases to verify the life insurance policy information.

After receiving all necessary information regarding the life insurance policy, the medical history and physical condition of the individual, and the proposed sale value from the purchase coordinator, the potential purchasers assess, by their own formulas, whether they can accept or enhance the proposed sale price of the life insurance policy of the individual. After completing such analysis and determining they have an interest to bid on the life insurance policy, the potential purchasers make bids for the life insurance policy to the purchase coordinator. The purchase coordinator's computing apparatus 603 receives (1005) the bids from the computing apparatus 606-608 of the potential purchasers and compares the bids to the proposed sale value. In one embodiment, the purchase coordinator's computing apparatus 603 receives the bids over the communication network (e.g., the Internet) via a website hosted on the purchase coordinator's computing apparatus 603.

After receiving the bids from the potential purchasers, the processing unit 805 of the purchase coordinator's computing apparatus 603 determines (1007) whether at least one of the bids is greater than or equal to the proposed sale value. If such a bid was not received, the sale ends and the underwriting entity and/or the individual is notified that the policy was not purchased (e.g., via a message communicated from the purchase coordinator's computing apparatus 603 to the underwriter's computing apparatus 601 or the individual's computing device 605). On the other hand, if at least one received bid was greater than or equal to the proposed sale value, processing unit 805 selects (1009) one of the bids as the winning bid (e.g., the highest bid, the highest bid from an institution with a threshold credit rating, etc.) and notifies the successful purchaser of the result (e.g., via the purchase coordinator's website, email, or other means of communication).

The purchase coordinator then effects (1011) the sale of the life insurance policy to the successful purchaser for a purchase price equivalent to the winning bid. For example, the purchase coordinator prepares documents to effectuate the purchase the policy and has the documents appropriately executed by the individual and the successful purchaser. The documents may include a purchase agreement to transfer any rights in the individual's life insurance policy to the successful purchaser, an agreement to allow for contact between the successful purchaser and the individual or his/her representative for updates as to the individual's status, any disclosures regarding the monies to be provided on behalf of the individual, verification of the privacy protection of the individual's financial and health information, and an escrow agreement for placing the sale proceeds in escrow (e.g., with the purchase coordinator or another party) pending designation of a third party (e.g., a trust) to retain the proceeds for use in paying the assisted living expenses of the individual, and the completion of the change of ownership of the life insurance policy to the successful purchaser.

In addition to transferring ownership of the life insurance policy to the successful purchaser, the individual or his/her representative engages a third party other than the individual to retain the sales proceeds for use in paying at least some of the assisted living expenses of the individual. In one embodiment, the selected party is a trustee that is bound by the terms of a trust document to retain the proceeds for the benefit of the individual and his or her beneficiaries and to use the proceeds as necessary to pay the assisted living expenses of the individual. Alternatively, the third party may be any party other than the individual that is bound by contract to use the sale proceeds to pay the assisted living expenses of the individual until the individual passes away.

After the change in ownership of the individual's life insurance policy from the individual to the successful purchaser has been verified and a third party has been selected by the individual to manage the sale proceeds, the purchase coordinator coordinates with the escrow agent to deliver (1013) the sales proceeds to the third party to pay the assisted living expenses of the individual. In the case where the third party is a trustee of a trust for the benefit of the individual, the trustee may disburse the proceeds over time to an assisted living facility for the living expenses of the individual based upon a proper invoice submitted by the assisted living facility or as a recurring monthly fee. Once all the sales proceeds have been divested from the trust, the trust may be dissolved. If the individual passes away before all the funds in the trust are used, any excess funds are presented to the individual's estate or beneficiary, as applicable, and the trust is dissolved.

The present invention encompasses a method and apparatus for increasing the liquid assets of an individual primarily for the purposes of funding, or at least partially funding, the individual's living expenses while resident at an assisted living facility. With this invention, life insurance is liquidated through sale (e.g., through use of a viatical settlement procedure) to increase the individual's independent ability to pay for at least some of the assisted living expenses of the individual, thereby delaying the individual's reliance and dependence upon government assistance. By delaying an individual's reliance upon government funding for assisted living expenses, government budgets can reduce amounts allocated for healthcare and can use such resources for other purposes or to decrease taxes. In addition, by using his or her own funds to pay assisted living expenses, the individual's own morale may be improved through knowledge that he or she is not simply a ward of the government.

In the foregoing specification, the present invention has been described with reference to specific embodiments. However, one of ordinary skill in the art will appreciate that various modifications and changes may be made without departing from the spirit and scope of the present invention as set forth in the appended claims. Accordingly, the specification and drawings are to be regarded in an illustrative rather than a restrictive sense, and all such modifications are intended to be included within the scope of the present invention.

Benefits, other advantages, and solutions to problems have been described above with regard to specific embodiments of the present invention. However, the benefits, advantages, solutions to problems, and any element(s) that may cause or result in such benefits, advantages, or solutions to become more pronounced are not to be construed as a critical, required, or essential feature or element of any or all the claims. As used herein and in the appended claims, the terms "comprises," "comprising" or any other variation thereof is intended to refer to a non-exclusive inclusion, such that a process, method, apparatus, or article of manufacture that comprises a list of elements does not include only those elements in the list, but may include other elements not expressly listed or inherent to such process, method, apparatus, or article of manufacture. All terms used in the appended claims that are not otherwise specifically defined herein should be accorded their ordinary meanings.

We claim:

1. A method for increasing liquid assets available to an individual to at least partially fund living expenses of the individual at an assisted living facility, the method comprising:

receiving, at a first computing apparatus operated on behalf of an underwriting entity, personal information regarding the individual, information regarding a medical history of the individual, and information regarding a life insurance policy for the individual;

determining, by the first computing apparatus, a mortality rating for the individual based at least on the medical history of the individual;

accessing, by the first computing apparatus, a database containing a mortality table;

determining, by the first computing apparatus, a life expectancy for the individual from the mortality table based at least on the personal information and the mortality rating for the individual;

determining, by the first computing apparatus, a proposed sale value for the life insurance policy based at least on the life expectancy for the individual and the information regarding the life insurance policy;

providing the proposed sale value to the individual;

receiving, at the first computing apparatus, an election of the individual to proceed with a sale of the life insurance policy for the proposed sale value;

responsive to the election, communicating, by the first computing apparatus via at least one communication network, at least the information regarding the life insurance policy, the information regarding the medical history of the individual, and the proposed sale value to a second computing apparatus operated on behalf of a purchase coordinator;

soliciting, by the purchase coordinator via the at least one communication network, potential purchasers for the life insurance policy;

receiving, by purchase coordinator via the at least one communication network, bids from the potential purchasers to buy the life insurance policy;

selecting, by the purchase coordinator, one of the bids as a winning bid for the life insurance policy, wherein the winning bid is greater than or equal to the proposed sale value and was made by a successful purchaser;

effecting, by the purchase coordinator, a sale of the life insurance policy to the successful purchaser for a purchase price equivalent to the winning bid; and delivering proceeds from the purchase price to a party other than the individual for use in paying at least some of the living expenses of the individual at the assisted living facility, wherein the party to whom the proceeds are delivered is bound to use the proceeds for paying at least some of the living expenses of the individual at the assisted living facility.

2. The method of claim 1, wherein the personal information regarding the individual includes gender information, age information, and information relating to whether the individual smokes; wherein the information regarding a medical history of the individual includes information regarding at least one health impairment possessed by the individual and information regarding a severity of the at least one health impairment; and wherein the information regarding a life insurance policy for the individual includes a death benefit amount, an issue date, information regarding frequency and amount of premium payments, information regarding outstanding loans secured by the life insurance policy, and information regarding a cash surrender value of the life insurance policy.

3. The method of claim 1, wherein the first computing apparatus includes a server operated on behalf of the underwriting entity, wherein the server hosts a website operable to receive information entered by users of the website, and wherein the personal information regarding the individual, the information regarding a medical history of the individual, and the information regarding a life insurance policy for the individual is received at the server via the website.

4. The method of claim 1, wherein providing the proposed sale value to the individual comprises:

providing, by the first computing apparatus via the at least one communication network, the proposed sale value to a computing device operated by at least one of the individual, a relative of the individual, a guardian of the individual, an attorney for the individual, and the assisted living facility.

5. The method of claim 1, wherein the mortality table is derived at least partially from empirical data collected by the underwriting entity regarding a plurality of deceased individuals, the empirical data including ages at death and at a time of health impairment evaluation on behalf of the underwriting entity, indications of health impairments and associated severities at the time of health impairment evaluation on behalf of the underwriting entity, and medical scores at the time of health impairment evaluation on behalf of the underwriting entity.

6. The method of claim 1, wherein the steps of soliciting potential purchasers and receiving bids to buy the life insurance policy are performed through operation of a website over the Internet.

7. A method for increasing liquid assets available to an individual to at least partially fund living expenses of the individual at an assisted living facility, the liquid assets including a life insurance policy that the individual has elected to sell for a proposed sale value, the method comprising:

receiving, at a first computing apparatus from a second computing apparatus via a first communication network, information regarding the life insurance policy, information regarding a medical history of the individual, and the proposed sale value, wherein the first computing apparatus is operated on behalf of a purchase coordinator and the second computing apparatus is operated on behalf of an underwriting entity;

soliciting, by the purchase coordinator via at least one communication network, potential purchasers for the life insurance policy;

receiving, by purchase coordinator via the at least one communication network, bids from the potential purchasers to buy the life insurance policy;

selecting, by the purchase coordinator, one of the bids as a winning bid for the life insurance policy, wherein the winning bid is greater than or equal to the proposed sale value and was made by a successful purchaser;

effecting, by the purchase coordinator, a sale of the life insurance policy to the successful purchaser for a purchase price equivalent to the winning bid; and delivering proceeds from the purchase price to a party other than the individual for use in paying at least some of the living expenses of the individual at the assisted living facility, wherein the party to whom the proceeds are delivered is bound to use the proceeds for paying at least some of the living expenses of the individual at the assisted living facility.

8. The method of claim 7, wherein the step of delivering proceeds comprises:

delivering proceeds from the purchase price to a trustee of a trust established to pay at least some of the living expenses of the individual at the assisted living facility, wherein the trustee is bound by the trust to use the proceeds to pay at least some of the living expenses of the individual at the assisted living facility.

9. The method of claim 7, wherein the steps of soliciting potential purchasers and receiving bids to buy the life insurance policy are performed through operation of a website over the Internet.

10. A method for increasing liquid assets available to an individual to at least partially fund living expenses of the individual at an assisted living facility, the method comprising:

receiving, at a first computing apparatus operated on behalf of an underwriting entity, personal information regarding the individual, information regarding a medical history of the individual, and information regarding a life insurance policy for the individual;

determining, by the first computing apparatus, a mortality rating for the individual based at least on the medical history of the individual;

accessing, by the first computing apparatus, a database containing a mortality table;

determining, by the first computing apparatus, a life expectancy for the individual from the mortality table based at least on the personal information and the mortality rating for the individual;

determining, by the first computing apparatus, a proposed sale value for the life insurance policy based at least on the life expectancy for the individual and the information regarding the life insurance policy;

providing the proposed sale value to the individual;

receiving, at the first computing apparatus, an election from the individual to proceed with a sale of the life insurance policy for the proposed sale value; and responsive to the election, communicating, by the first computing apparatus via a communication network, at least the information regarding the life insurance policy, the information regarding the medical history of the individual, and the proposed sale value to a second computing apparatus operated on behalf of a purchase coordinator to complete the sale of the life insurance policy for at least the proposed sale value, wherein sale of the life insurance policy results in proceeds from the sale being delivered to a party other than the individual for use in paying at least some of the living expenses of the individual at the assisted living facility and wherein the party to whom the proceeds are delivered is bound to use the proceeds for paying at least some of the living expenses of the individual at the assisted living facility.

11. The method of claim 10, wherein the first computing apparatus is a server operated on behalf of the underwriting entity, wherein the server hosts a website operable to receive information entered by users of the website, and wherein the personal information regarding the individual, the information regarding a medical history of the individual, and the information regarding a life insurance policy for the individual is received at the server via the website.

12. The method of claim 10, wherein the personal information regarding the individual includes gender information, age information, and information relating to whether the individual smokes; wherein information regarding a medical history of the individual includes an identification of at least one health impairment possessed by the individual and an indication of a severity of the at least one health impairment; and wherein information regarding a life insurance policy for the individual includes a death benefit amount, an issue date, information regarding frequency and amount of premium payments, information regarding outstanding loans secured by the life insurance policy, and information regarding a cash surrender value of the life insurance policy.

13. The method of claim 10, wherein providing the proposed sale value to the individual comprises:
providing, by the first computing apparatus via a communication network, the proposed sale value to a computing device operated by at least one of the individual, a relative of the individual, a guardian of the individual, an attorney for the individual, and the assisted living facility.

14. The method of claim 10, wherein the information regarding a medical history of the individual includes information regarding a plurality of health impairments possessed by the individual and information regarding severities of the plurality of health impairments, and wherein determining a mortality rating for the individual comprises:
assigning point values to a variety of health impairments based on severities of the health impairments such that more severe health impairments are assigned higher point values than less severe health impairments to produce a plurality of assigned point values;
determining a point value from the plurality of assigned point values for each health impairment of the plurality of health impairments possessed by the individual to produce a plurality of determined point values; and summing the plurality of determined point values to produce the mortality rating for the individual.

15. The method of claim 10, wherein the personal information regarding the individual includes information from which age, gender, and smoking status of the individual are determinable and wherein determining a life expectancy for the individual comprises:
categorizing the individual into a category of the mortality table based on the mortality rating, an age of the individual, a gender of the individual, and a smoking status of the individual; and
determining the life expectancy for the individual from the mortality table as a life expectancy for the category into which the individual was categorized.

16. The method of claim 10, wherein the information regarding the life insurance policy includes a death benefit amount and wherein determining a proposed sale value for the life insurance policy comprises:
determining a discount value based on the information regarding the life insurance policy, the life expectancy for the individual, and an expected interest rate for the successful purchaser; and
subtracting the discount value from the death benefit amount to produce the proposed sale value.

17. The method of claim 10, wherein the information regarding the life insurance policy includes a death benefit amount, information regarding frequency and amount of premium payments, information regarding outstanding loans secured by the life insurance policy, and information regarding a cash surrender value of the life insurance policy, and wherein determining a proposed sale value for the life insurance policy comprises:
determining a percentage of the death benefit amount based on the expected interest rate for the successful purchaser to produce a discount percentage;
determining a total balance of outstanding loans secured by the life insurance policy based on the information regarding outstanding loans secured by the life insurance policy to produce a total loan balance;
determining a total balance of premiums remaining to be paid for the life insurance policy based on the life expectancy for the individual and the information regarding frequency and amount of premium payments to produce a total premium balance;
subtracting the total loan balance and the total premium balance from the death benefit amount to produce a difference;
multiplying the difference by the discount percentage to produce a result;
determining whether the life insurance policy has a cash surrender value based on the information regarding a cash surrender value of the life insurance policy;
in the event that the life insurance policy has a cash surrender value,
setting the proposed sale value equal to the result when the result is greater than or equal to the cash surrender value;
setting the proposed sale value equal to the cash surrender value when the result is less than the cash surrender value; and
in the event that the life insurance policy does not have a cash surrender value, setting the proposed sale value equal to the result.

18. The method of claim 10, wherein the information regarding the life insurance policy includes a death benefit amount and wherein determining a proposed sale value for the life insurance policy comprises:

determining a discount value based on statutory requirements for a particular state in which sale of the life insurance policy is to be made, the information regarding the life insurance policy, and the life expectancy for the individual; and subtracting the discount value from the death benefit amount to produce the proposed sale value.

19. The method of claim 10, wherein the information regarding the life insurance policy includes a death benefit amount, information regarding frequency and amount of premium payments, and information regarding outstanding loans secured by the life insurance policy, and wherein determining a proposed sale value for the life insurance policy comprises:

determining a percentage of a net death benefit amount based on the statutory requirements and the life expectancy for the individual to produce a discount percentage;

determining a total balance of outstanding loans secured by the life insurance policy based on the information regarding outstanding loans secured by the life insurance policy to produce a total loan balance;

determining a total balance of premiums remaining to be paid for the life insurance policy based on the life expectancy for the individual and the information regarding frequency and amount of premium payments to produce a total premium balance;

subtracting the total loan balance and the total premium balance from the death benefit amount to produce the net death benefit amount; and multiplying the net death benefit amount by the discount percentage to produce the proposed sale value.

20. A computing apparatus operable on behalf of an underwriting entity to assist in increasing liquid assets available to an individual to at least partially fund living expenses of the individual at an assisted living facility, the computing apparatus comprising:

a memory operable to store a computer program;

a database containing a mortality table;

at least one communication network interface for interfacing the computing apparatus to at least one communication network; and a processing unit operably coupled to the memory, the database, and the at least one communication network interface, the processing unit operable in accordance with the computer program to:

receive personal information regarding the individual, information regarding a medical history of the individual, and information regarding a life insurance policy for the individual via the at least one communication network interface;

determine a mortality rating for the individual based at least on the medical history of the individual;

determine a life expectancy for the individual from the mortality table based at least on the personal information and the mortality rating for the individual;

determine a proposed sale value for the life insurance policy based at least on the life expectancy for the individual and the information regarding the life insurance policy;

provide the proposed sale value to the individual via the at least one communication network interface;

receive an election from the individual to proceed with a sale of the life insurance policy for the proposed sale value via the at least one communication network interface; and responsive to the election, communicate, via the at least one communication network interface, the information regarding the life insurance policy, the information regarding the medical history of the individual, and the proposed sale value to a second computing apparatus operated on behalf of a purchase coordinator to complete the sale of the life insurance policy for at least the proposed sale value.

21. The computing apparatus of claim 20, wherein the mortality table is derived at least partially from empirical data collected by the underwriting entity regarding a plurality of deceased individuals, the empirical data including ages at death and at a time of health impairment evaluation on behalf of the underwriting entity, indications of health impairments and associated severities at the time of health impairment evaluation on behalf of the underwriting entity, and medical scores at the time of health impairment evaluation on behalf of the underwriting entity.

* * * * *